US012639771B2

(12) United States Patent
Monforte

(10) Patent No.: US 12,639,771 B2
(45) Date of Patent: May 26, 2026

(54) ELECTRIC GRID LOAD FORECASTS WITH DISTRIBUTED PHOTOVOLTAIC GENERATION

(71) Applicant: Itron, Inc., Liberty Lake, WA (US)

(72) Inventor: Frank Anthony Monforte, Encinitas, CA (US)

(73) Assignee: Itron, Inc., Liberty Lake, WA (US)

( * ) Notice: Subject to any disclaimer, the term of this patent is extended or adjusted under 35 U.S.C. 154(b) by 679 days.

(21) Appl. No.: 18/087,719

(22) Filed: Dec. 22, 2022

(65) Prior Publication Data

US 2024/0212070 A1 Jun. 27, 2024

(51) Int. Cl.
| | |
|---|---|
| *G06Q 50/06* | (2024.01) |
| *H02J 3/00* | (2006.01) |
| *H02J 3/38* | (2006.01) |

(52) U.S. Cl.
CPC .............. *G06Q 50/06* (2013.01); *H02J 3/003* (2020.01); *H02J 3/004* (2020.01); *H02J 3/381* (2013.01);
(Continued)

(58) Field of Classification Search
CPC ......... G06Q 50/06; G06Q 10/04; H02J 3/003; H02J 3/004; H02J 3/381; H02J 2203/10;
(Continued)

(56) References Cited

U.S. PATENT DOCUMENTS

2011/0307109 A1* 12/2011 Sri-Jayantha .......... G06Q 10/04
700/291

2014/0156322 A1* 6/2014 Monforte ................ H02J 3/004
705/7.11
(Continued)

FOREIGN PATENT DOCUMENTS

| CN | 105375533 A | 3/2016 |
|---|---|---|
| CN | 111224418 A | 6/2020 |

OTHER PUBLICATIONS

S. Dash, "Smoothing Techniques for time series data," Medium, published May 25, 2020, downloaded from https://medium.com/@srv96/smoothing-techniques-for-time-series-data-91cccfd008a2 (Year: 2020).*

(Continued)

*Primary Examiner* — Eric J Yoon
(74) *Attorney, Agent, or Firm* — Lee & Hayes, P.C.

(57) ABSTRACT

In the context of an electrical utility system, changing cloud conditions may cause a customer having solar panels to greatly increase or decrease electrical demand in a difficult-to-predict manner. Accordingly, a spinning reserve maintained by an electric utility company must be larger, and is therefore more expensive. In an example, the spinning reserve may be managed by: calculating a stable sequence of forecasts of smoothed real-time consumption, wherein the calculating is based at least in part on smoothed estimates of consumption data. A stable sequence of forecasts of real-time measured load may be calculated by subtracting forecasts of real-time distributed solar photovoltaic (PV) generation data from the stable sequence of forecasts of smoothed real-time consumption. The spinning reserve of the electricity system may be controlled based at least in part on the stable sequence of forecasts of real-time measured load.

13 Claims, 13 Drawing Sheets

(52) U.S. Cl.
CPC ....... *H02J 2203/10* (2020.01); *H02J 2300/24*
(2020.01)

(58) Field of Classification Search
CPC .... H02J 2300/24; H02S 50/00; G01R 21/133;
Y04S 10/50; Y04S 20/222; Y04S 20/221;
Y04S 50/16; Y02B 70/3225
See application file for complete search history.

(56) References Cited

U.S. PATENT DOCUMENTS

| | | | | |
|---|---|---|---|---|
| 2015/0142347 A1* | 5/2015 | Mohan | | H02S 50/00 |
| | | | | 702/60 |
| 2019/0165580 A1 | 5/2019 | Doherty et al. | | |
| 2020/0067312 A1* | 2/2020 | Pavlovski | | H02J 3/003 |
| 2022/0385064 A1* | 12/2022 | Cruickshank, III | | H02J 3/003 |
| 2023/0103959 A1* | 4/2023 | Pavlovski | | G01W 1/10 |
| | | | | 702/3 |
| 2023/0244947 A1* | 8/2023 | Woo | | G06N 3/045 |
| | | | | 706/21 |

OTHER PUBLICATIONS

Office Action for Canadian Application No. 3,214,451, Dated Dec. 5, 2024, 5 pages.

Examination Report for Australian Application No. 2023251496, Dated Sep. 26, 2024, 6 pages.

Jahn, et al., "Guidelines for Operation and Maintenance of Photovoltaic Power Plants in Different Climates", retrieved on Sep. 26, 2024, at <<https://https://iea-pvps.org/wp-content/uploads/2022/11/IEA-PVPS-Report-T13-25-2022-OandM-Guidelines.pdf>>, International Energy Agency Photovoltaic Power Systems Programme Report, Oct. 2022, pp. 1-152.

Lorenz, et al., "Forecasting Solar Radiation", retrieved on Sep. 26, 2024, at <<https://www.nrel.gov/docs/fy21osti/77635.pdf>>, Best Practices Handbook for the Collection and Use of Solar Resource Data for Solar Energy Applications, Apr. 2021, pp. 1-348.

Alfred Haar. Zur Theorie der orthogonalen Funktionensysteme. Mathematische Annalen, 1910, 69 (3), pp. 331-371.

NOAA Solar Calculator; ESRL Global Monitoring Laboratory - Global Radiation and Aerosols; retrieved from https://gml.noaa.gov/grad/solcalc/ on Jan. 16, 2023; 2 pages.

Savitzky, et al; "Smoothing and Differentiation of Data by Simplified Least Squares Procedures" Anal. Chem. 1964, 36, 8; Publication Date: Jul. 1, 1964.

Search Report for European Application No. 23206852.8, Dated May 27, 2024, 7 pages.

Examination Report for Australian Application No. 2023251496, Dated Sep. 9, 2025, 6 pages.

Examination Report for Canadian Application No. 3,214,451, Dated Oct. 14, 2025, 4 pages.

* cited by examiner

TECHNIQUES AND PROGRAMMING FOR PERFORMING ELECTRIC GRID LOAD FORECASTS FOR AN ELECTRICAL UTILITY SYSTEM HAVING SIGNIFICANT SOLAR PHOTOVOLTAIC (PV) GENERATION 104

CENTRAL OFFICE SERVER(S) 102

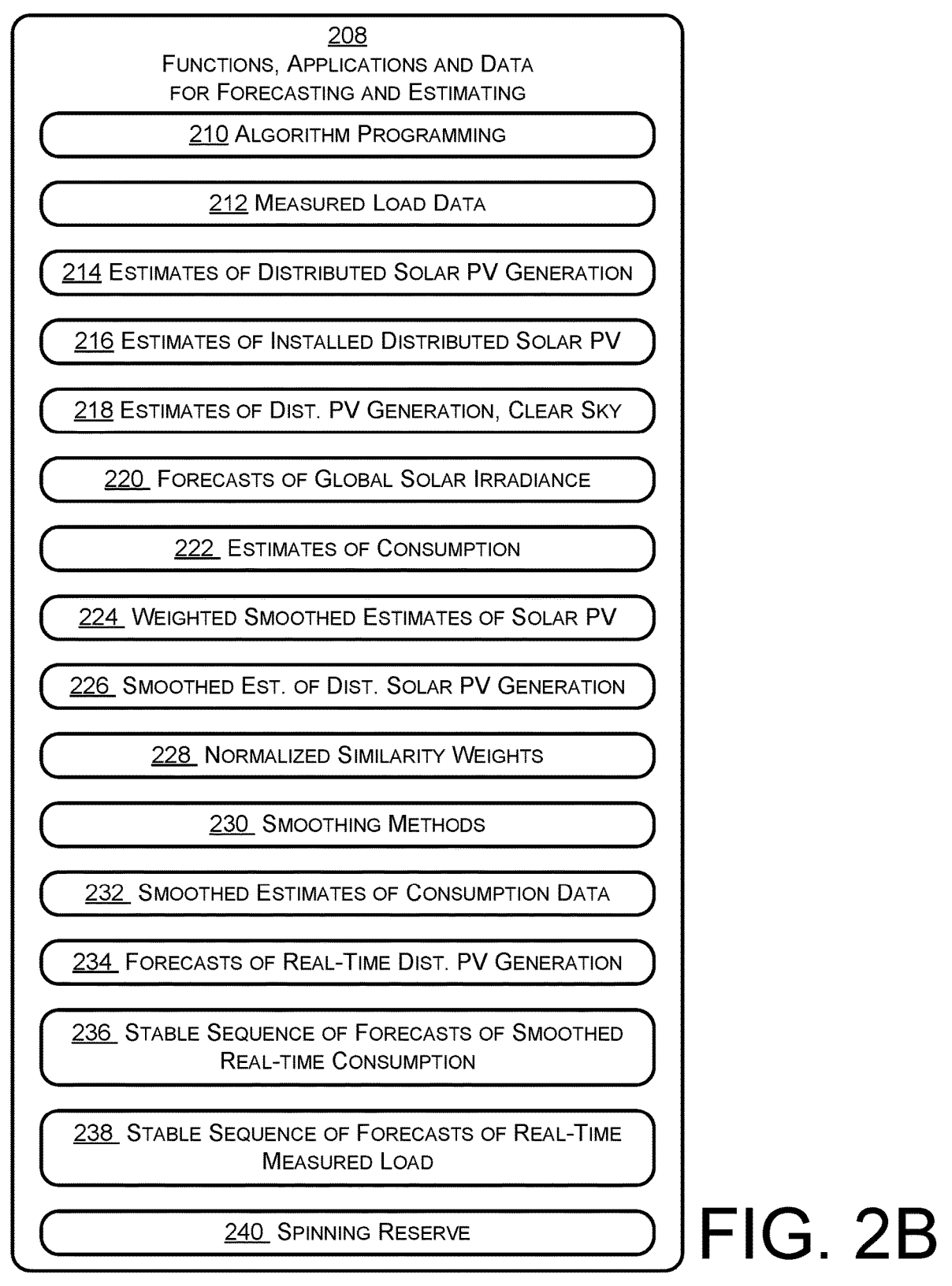

208
FUNCTIONS, APPLICATIONS AND DATA
FOR FORECASTING AND ESTIMATING

210 ALGORITHM PROGRAMMING

212 MEASURED LOAD DATA

214 ESTIMATES OF DISTRIBUTED SOLAR PV GENERATION

216 ESTIMATES OF INSTALLED DISTRIBUTED SOLAR PV

218 ESTIMATES OF DIST. PV GENERATION, CLEAR SKY

220 FORECASTS OF GLOBAL SOLAR IRRADIANCE

222 ESTIMATES OF CONSUMPTION

224 WEIGHTED SMOOTHED ESTIMATES OF SOLAR PV

226 SMOOTHED EST. OF DIST. SOLAR PV GENERATION

228 NORMALIZED SIMILARITY WEIGHTS

230 SMOOTHING METHODS

232 SMOOTHED ESTIMATES OF CONSUMPTION DATA

234 FORECASTS OF REAL-TIME DIST. PV GENERATION

236 STABLE SEQUENCE OF FORECASTS OF SMOOTHED REAL-TIME CONSUMPTION

238 STABLE SEQUENCE OF FORECASTS OF REAL-TIME MEASURED LOAD

240 SPINNING RESERVE

FIG. 2B

ALTERNATIVE LOAD DATA SMOOTHING USING A 17 POINT SMOOTHING WINDOW (MW)

SOLAR PV, AVERAGE SOLAR PV & INSTANTENOUS SOLAR PV DEVIATIONS (MW)

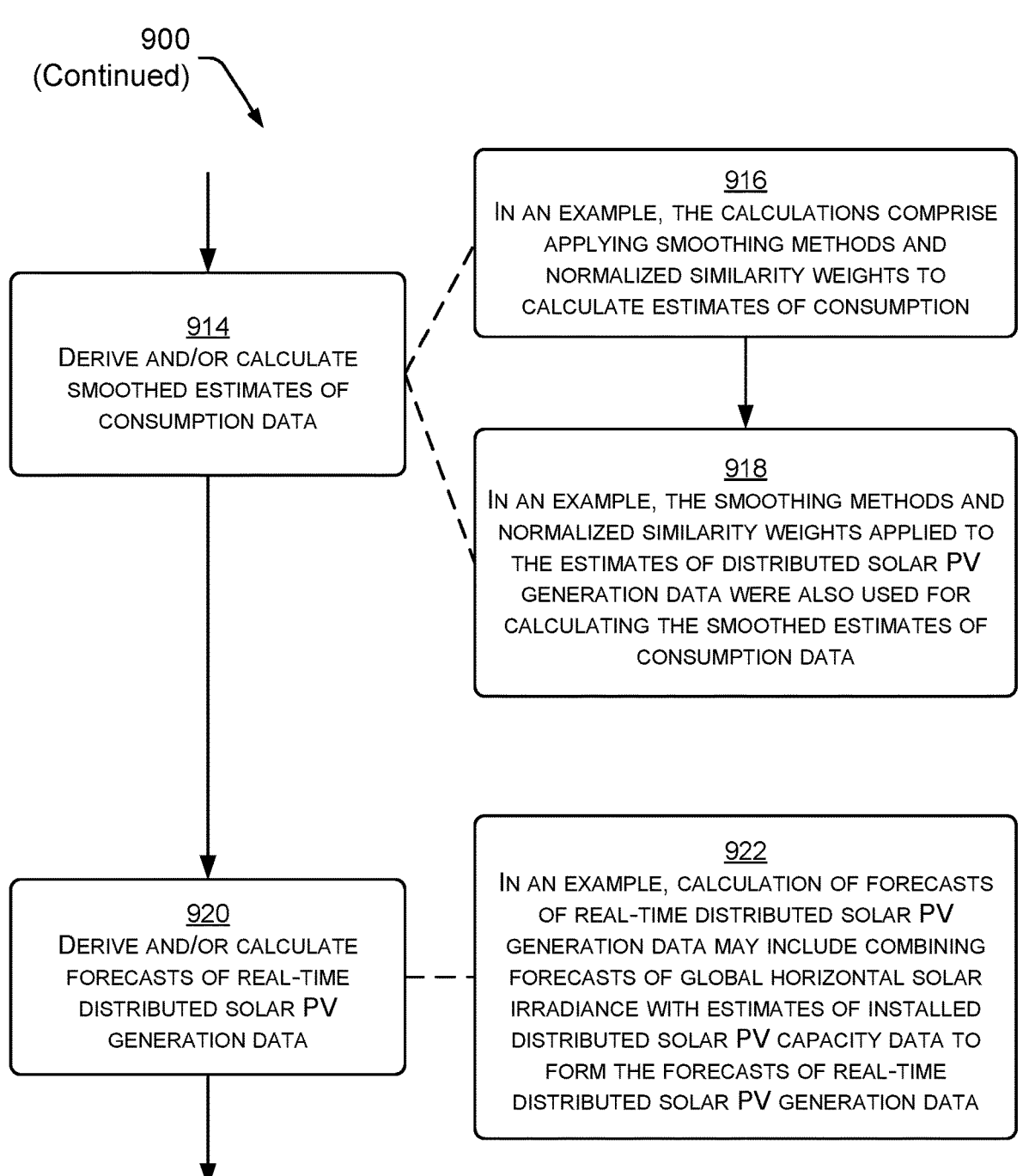

900
(Continued)

914
DERIVE AND/OR CALCULATE
SMOOTHED ESTIMATES OF
CONSUMPTION DATA

916
IN AN EXAMPLE, THE CALCULATIONS COMPRISE
APPLYING SMOOTHING METHODS AND
NORMALIZED SIMILARITY WEIGHTS TO
CALCULATE ESTIMATES OF CONSUMPTION

918
IN AN EXAMPLE, THE SMOOTHING METHODS AND
NORMALIZED SIMILARITY WEIGHTS APPLIED TO
THE ESTIMATES OF DISTRIBUTED SOLAR PV
GENERATION DATA WERE ALSO USED FOR
CALCULATING THE SMOOTHED ESTIMATES OF
CONSUMPTION DATA

920
DERIVE AND/OR CALCULATE
FORECASTS OF REAL-TIME
DISTRIBUTED SOLAR PV
GENERATION DATA

922
IN AN EXAMPLE, CALCULATION OF FORECASTS
OF REAL-TIME DISTRIBUTED SOLAR PV
GENERATION DATA MAY INCLUDE COMBINING
FORECASTS OF GLOBAL HORIZONTAL SOLAR
IRRADIANCE WITH ESTIMATES OF INSTALLED
DISTRIBUTED SOLAR PV CAPACITY DATA TO
FORM THE FORECASTS OF REAL-TIME
DISTRIBUTED SOLAR PV GENERATION DATA

FIG. 9B

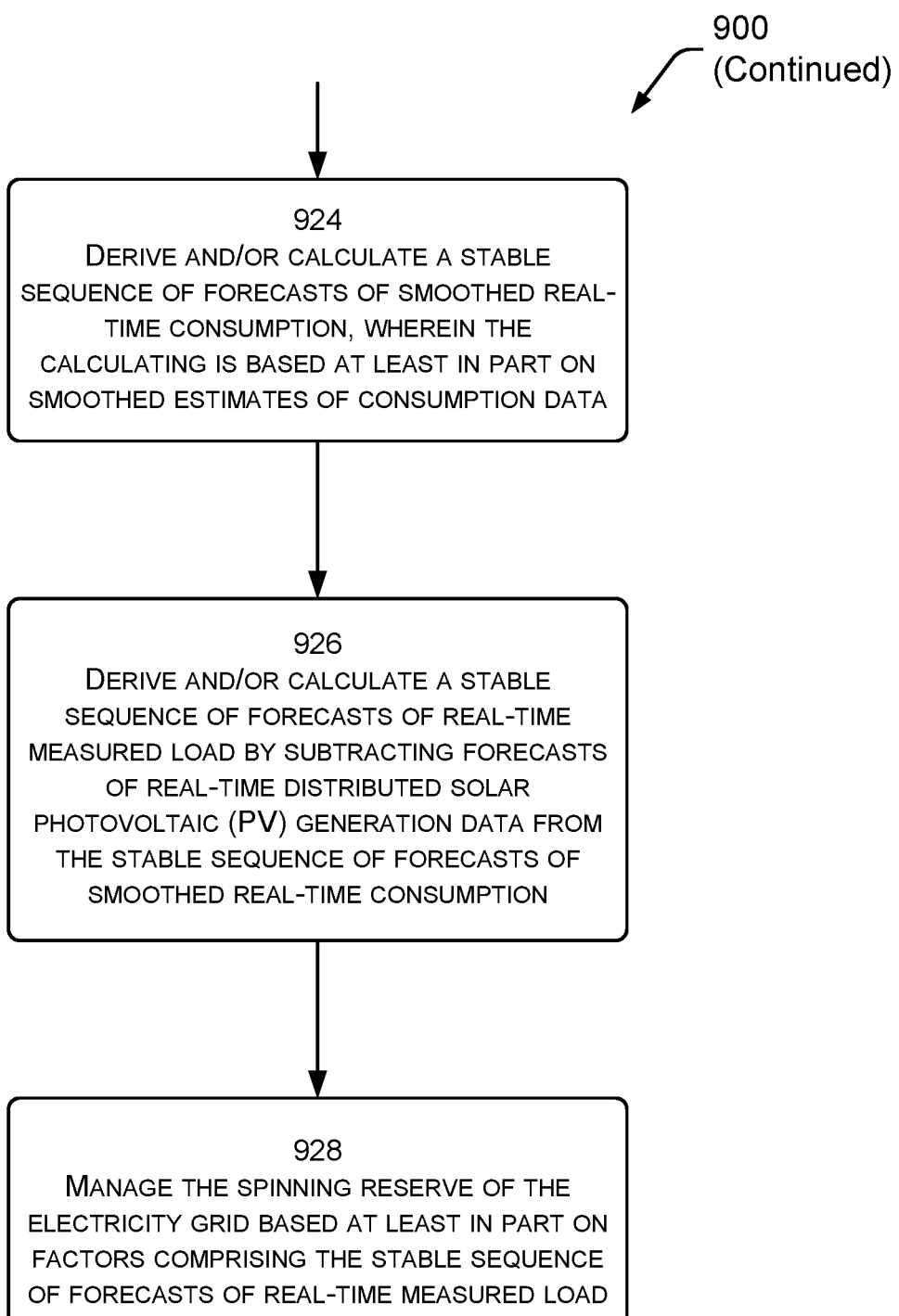

900
(Continued)

924
DERIVE AND/OR CALCULATE A STABLE
SEQUENCE OF FORECASTS OF SMOOTHED REAL-
TIME CONSUMPTION, WHEREIN THE
CALCULATING IS BASED AT LEAST IN PART ON
SMOOTHED ESTIMATES OF CONSUMPTION DATA

926
DERIVE AND/OR CALCULATE A STABLE
SEQUENCE OF FORECASTS OF REAL-TIME
MEASURED LOAD BY SUBTRACTING FORECASTS
OF REAL-TIME DISTRIBUTED SOLAR
PHOTOVOLTAIC (PV) GENERATION DATA FROM
THE STABLE SEQUENCE OF FORECASTS OF
SMOOTHED REAL-TIME CONSUMPTION

928
MANAGE THE SPINNING RESERVE OF THE
ELECTRICITY GRID BASED AT LEAST IN PART ON
FACTORS COMPRISING THE STABLE SEQUENCE
OF FORECASTS OF REAL-TIME MEASURED LOAD

FIG. 9C

ELECTRIC GRID LOAD FORECASTS WITH DISTRIBUTED PHOTOVOLTAIC GENERATION

BACKGROUND

In the context of an electrical utility system, solar photovoltaic (PV) power generation volatility creates load volatility and load forecast instability. For example, changing cloud conditions may cause a customer having solar panels to greatly increase or decrease electrical demand from the electricity grid in a difficult-to-predict manner. Accordingly, grid-connected power generation facilities (e.g., gas-powered turbines) must be utilized as spinning reserve, to prevent failure to meet electrical demand if PV generation decreases precipitously. Without the spinning reserve, unforeseen changes in cloud cover might result in brown-outs. In an example of spinning reserve, gas-powered turbines are operated at low gas levels, so that they can be rapidly accelerated, if needed. Accordingly, while PV power generation is advantageous, it creates substantial electrical grid volatility and added spinning reserve costs.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

FIGS. 9A-C each show a portion of a flowchart describing management of spinning reserve in an electrical utility system having distributed solar photovoltaic (PV) generation.

DETAILED DESCRIPTION

Overview

The disclosure describes techniques for performing electric grid load forecasts for an electrical utility system having distributed solar photovoltaic (PV) generation. In an electrical supply system wherein many customers have electricity-generating PV panels, the demand of such customers may go up and down precipitously due to changes in cloud cover. However, generation of a stable sequence of forecasts of real-time measured load would allow reduction of spinning reserve, and lower costs of operation.

Distributed solar PV generation adds volatility to real-time load measurements. Real-time load forecasts that launch off real-time load measurements will reflect the increased load volatility leading to forecast instability. To cover the increase in forecast uncertainty arising from the forecast instability, additional spinning reserves are scheduled thus increasing the cost of operating an electric grid. The forecast framework introduced here reduces forecast instability by reducing the impact of volatile distributed solar PV generation on the real-time load forecasts.

In an example, a stable sequence of real-time forecasts for loads at 17:00 that are made at 08:00 am, 08:05 am, 08:10 am would vary by less than one standard deviation. In contrast, an unstable sequence of real-time forecasts for loads at 17:00 that are made at 08:00, 08:05, 08:10 would vary by more than one standard deviation. Other examples of a stable sequence may depend on the electricity grid, design requirements, comparison(s) of spinning reserve costs at different variances, etc.

In this document, the terms "estimate" or "estimated" are used to refer to historical events and/or data, while the terms "forecast" or "forecasted" are used to refer to future events.

Example Electric Grid

Figure 1:
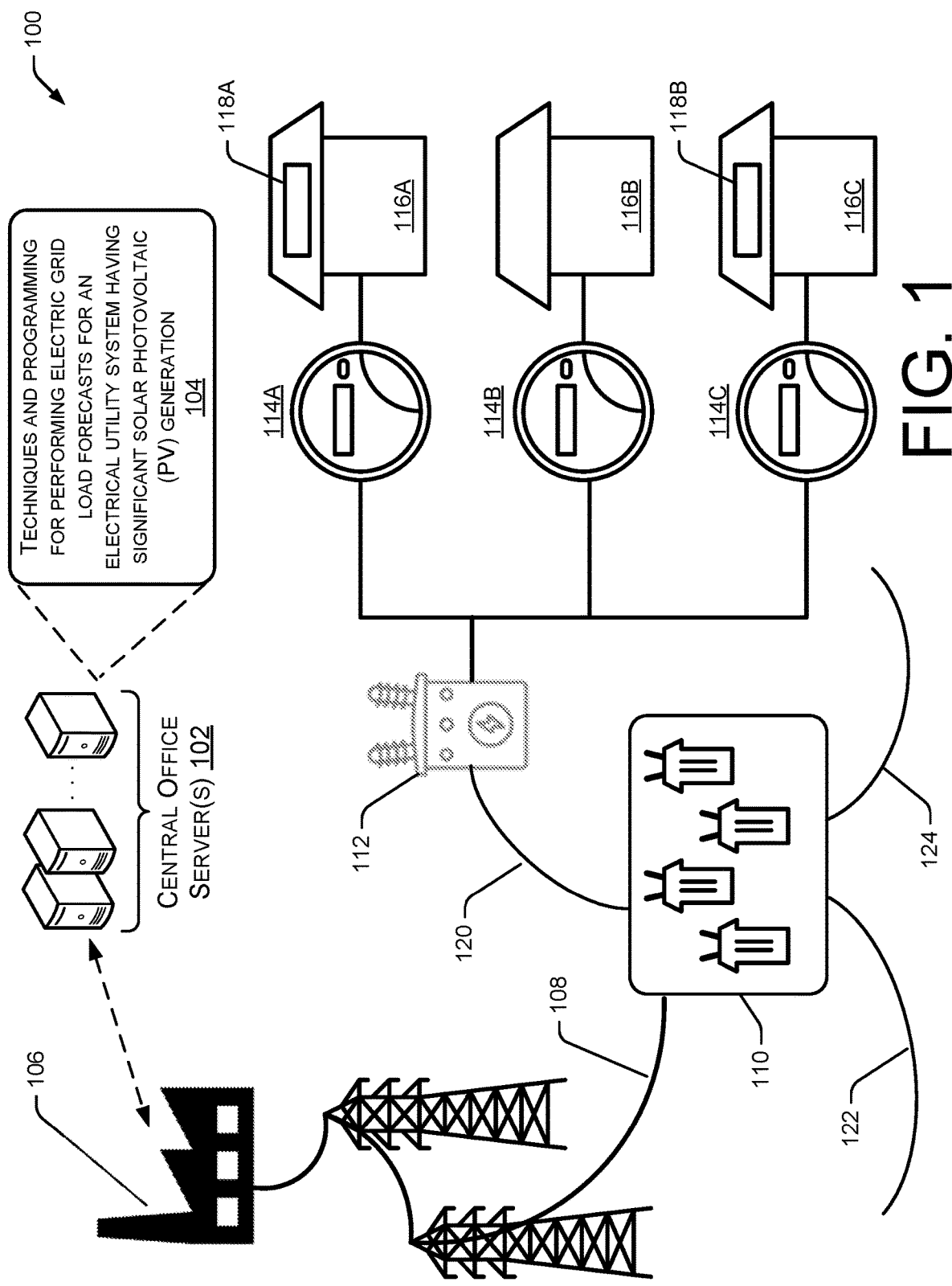
FIG. 1 is a block diagram showing an electrical utility system.

FIG. 1 shows an example electrical utility system 100. In the example, one or more central office servers 102 are configured to include software 104 for performing electric grid load forecasts within an electrical utility system having distributed solar photovoltaic (PV) generation. The central office server(s) are in communication over network(s) with an electricity generating facility 106. In different examples, the central office servers 102 and the electricity generating facility 106 are in the same or different physical locations. High voltage transmission lines 108 are connected to a substation 110. The substation provides electricity to a transformer 112 (other transformers are not shown for drawing clarity). The transformer 112 provides low voltage electricity (e.g., 120 or 240 volts) to a plurality of customers' electricity meters 114A-C. The customers may utilize their electricity service in houses or buildings associated with homes and businesses, respectively. Some of the houses and/or buildings 116A-C may have solar photovoltaic (PV) panels 118A, 118B, while others do not. While the transformer 112 is connected to one phase 120 of electricity, other phases 122, 124 also serve transformer(s) and customers (not shown for reasons of drawing clarity).

Example Server

Figure 2A:
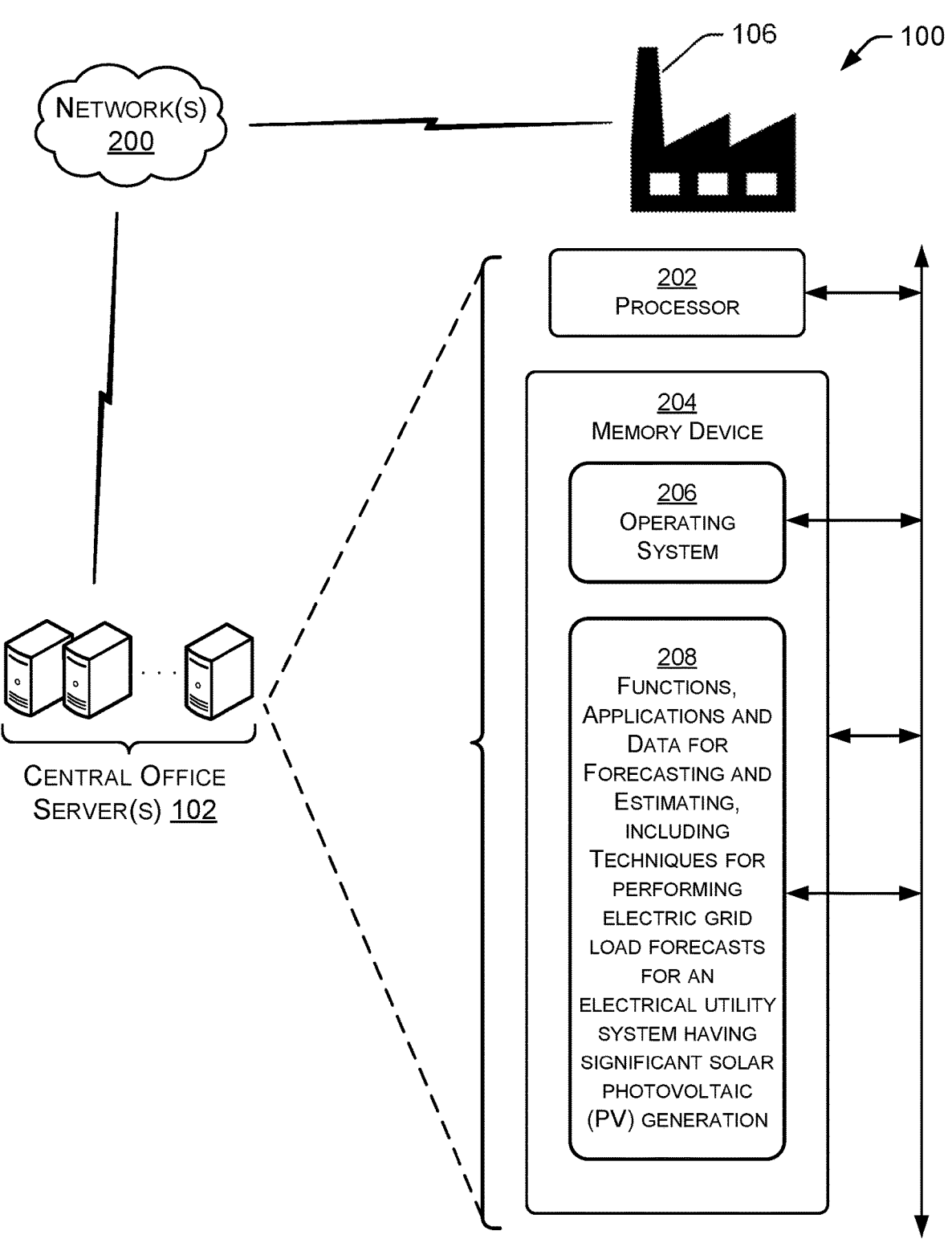
FIG. 2 (made up of FIGS. 2A and 2B) is a block diagram showing a server configured to perform electricity grid management functions, including the performance of electric grid load forecasts on an electrical utility system having distributed solar photovoltaic (PV) generation.

FIGS. 2A and 2B show example detail of a server 102 within the electricity supply system 100. The server 102 is configured to perform electric grid load forecasts within an electrical utility system having distributed solar photovoltaic (PV) generation. The examples of FIGS. 2A and 2B are not meant to be exhaustive or limiting, but serve to help the reader understand possible functions and applications. Additionally, the structures of FIGS. 2A and 2B are an example implementation of the flowcharts, charts, equations, description, and other materials herein.

Referring to FIG. 2A, an example electrical utility system 100 is shown, including central office server(s) 102, networks (e.g., the internet, cellular system, etc.) 200, and an electricity generation facility 106. The central office server 102 may include a processor 202 in communication with a memory device 204. The memory device may include an operating system 206, and also appropriate drivers and general-purpose applications (not shown for reasons of drawing clarity). Functions, applications, and data 208 are configured for data forecasting and estimating, including techniques for performing electric grid load forecasts for an electrical utility system having distributed solar photovoltaic (PV) generation. Any technology described herein may be implemented by, and included within, the functions, applications, and data 208.

Figure 9A:
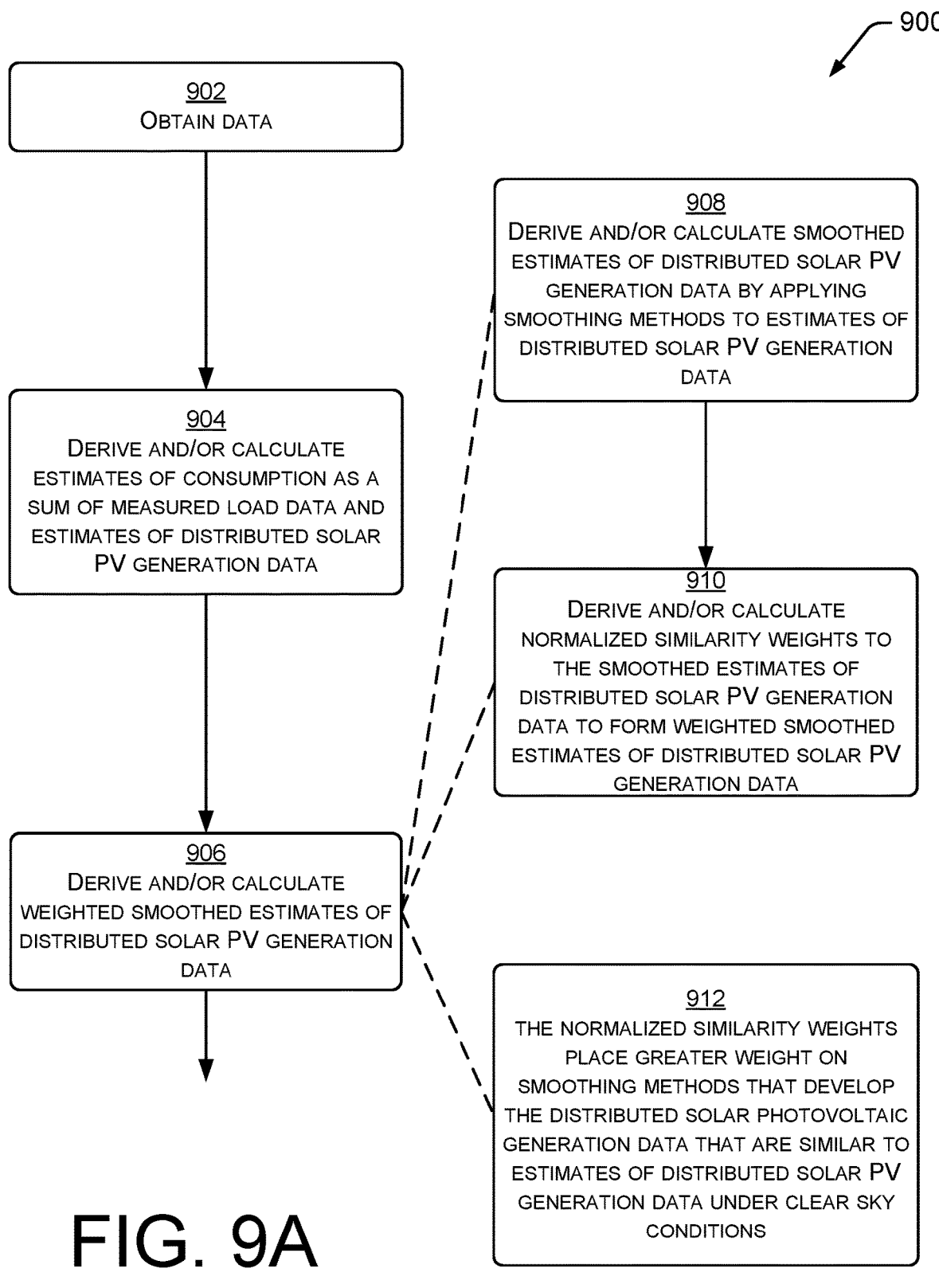
Figure 10:
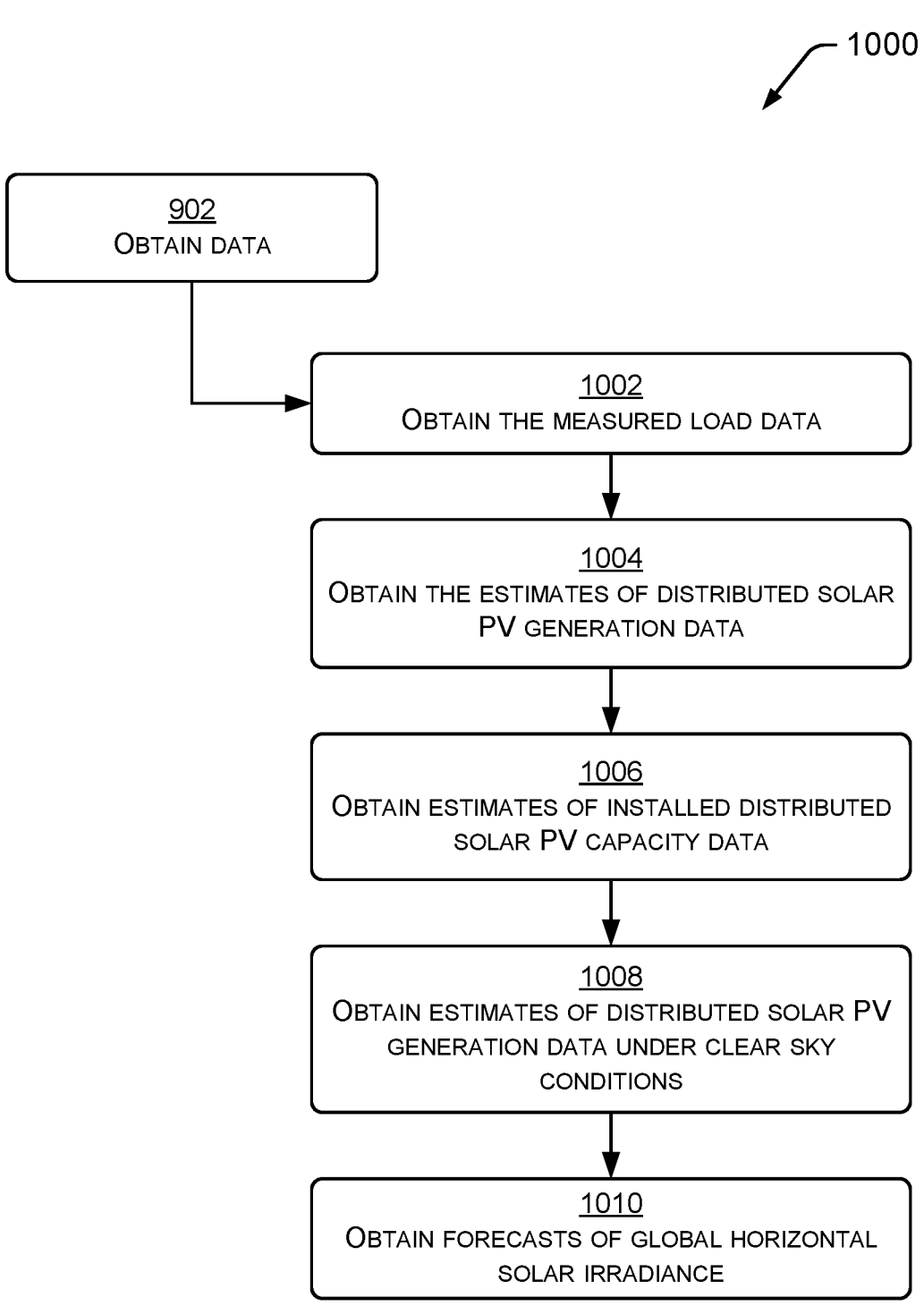
FIG. 10 is a flowchart showing example data collection techniques.

FIG. 2B shows added detail of a representative example of the functions, applications, and data 208. Algorithm programming 210 performs tasks related to making electric grid load forecasts within an electrical utility system having distributed solar photovoltaic (PV) generation. An example of the algorithm programming 210 is shown in FIGS. 9 and 10. Accordingly, algorithm programming 210 may be configured to perform any—and any combination of—the functions described herein. The functions, data, data types, etc. 210 through 240 are discussed in locations within this document.

Example Electric Grid Load Forecasts with Distributed PV Generation

The power that power-grid operators measure as demand is becoming obfuscated by offsetting unmetered solar PV generation. Such PV generation is distributed and growing, e.g., with more and more solar photovoltaic (PV) systems on the rooftops of homes and businesses. This results in demand for power measurements that are growing in volatility due to the volatility of distributed solar PV systems. Load forecast models that rely on real-time measurement of power consumption are experiencing growing forecast instability resulting from the volatile load measurements. In an example, two alternative measures of power consumption are developed for the case with no distributed solar PV generation present in an electrical load zone. These measures are then augmented to account for the impact of distributed solar PV generation.

Supervisory Control and Data Acquisition (SCADA) Metering. The first measure of power consumption is implemented widely by transmission and distribution system operators using the real-time measurements collected by a SCADA system. A SCADA system is used for real-time data acquisition, and monitoring and controlling power systems. Typically, a SCADA system is used to monitor and control all grid-connected generation units and net transmission/distribution system interchanges. To ensure the operating frequency of the power grid remains within safe operating tolerances, dispatched generation after adjusting for transmission and distribution losses equals power consumed. Using SCADA measurements of all transmission grid connected generation units and net transmission grid exchanges plus assumptions about transmission and distribution losses estimates of power consumption are computed as follows:

$$L_{d,i}^{SCADA} = \left[ \sum_{s=1}^{S} GridConnectedGeneration_{d,i}^{s} - \right.$$

$$\left. \sum_{n=1}^{N} NetTransmissionGridExchanges_{d,i}^{n} \right] \times \left( 1 - SystemLosses_{d,i} \right)$$

$$\text{Equation 1}$$

$$C_{d,i}^{SCADA} = L_{d,i}^{SCADA} \qquad \text{Equation 2}$$

Where, $$L_{d,i}^{SCADA}$$

is the SCADA estimate of power consumption on day (d) and time interval (i);

$$NetTransmissionGridExchanges_{d,i}^{n}$$

is measured generation for grid connected generation resource (s) on day (d) and time interval (i);

$$GridConnectedGeneration_{d,i}^{s}$$

is the difference between power flow out of the control area and the power flow into the control area at transmission exchange point (n) on day (d) and time interval (i);

$SystemLosses_{d,i}$ represents transmission and distribution losses on day (d) and time interval (i);

$$C_{d,i}^{SCADA}$$

is the SCADA based estimate of unmeasured consumption of power on day (d) and time interval (i); and $\Sigma$ is the summation operator.

Endpoint Metering. The second measure of power consumption is based on the endpoint metering of the net power delivered to the end user. The end-point metering estimate of power consumption is described as follows:

$$L_{d,i}^{BiDir} = \sum_{p=1}^{P} \left( Intake\_Channel_{d,i}^{p} - Offtake\_Channel_{d,i}^{p} \right) \qquad \text{Equation 3}$$

$$C_{d,i}^{BiDir} = L_{d,i}^{BiDir} \qquad \text{Equation 4}$$

Here, $$Intake\_Channel_{d,i}^{p} \geq 0, \forall d, i, p$$

$$Offtake\_Channel_{d,i}^{p} = 0, \forall d, i, p$$

Where, $$L_{d,i}^{BiDir}$$

is the Bi-directional power metering across all end users (p) on day (d) and time interval (i);

$$Intake\_Channel_{d,i}^{p}$$

is the metered value of electricity flowing to end user (p) on day (d) and time interval (i);

$$Offtake\_Channel_{d,i}^{p}$$

is the metered value of electricity flowing from end user (p) on day (d) and time interval (i); and $$C_{d,i}^{BiDir}$$

is the bi-directional meter estimate of power consumption on day (d) and time interval (i) without distributed energy resource.

Without distributed solar PV generation the two alternative measures of power consumption are equal. That is, $$C_{d,i}^{SCADA} = L_{d,i}^{SCADA} = L_{d,i}^{BiDir} = C_{d,i}^{BiDir} \qquad \text{Equation 5}$$

Further, there is a direct relationship between changes in consumption and changes in load.

When distributed solar PV generation is introduced the relationship between measured load and power consumption is obfuscated. From the perspective of endpoint metering, what is measured as load is the net difference between endpoint power consumption and endpoint solar PV generation. In this case the value of the Offtake Channel will be nonzero whenever solar PV generation exceeds power consumption. Formally, $$C_{d,i}^{p} - PV_{d,i}^{p} = \text{Intake\_Channel}_{d,i}^{p} - \text{Offtake\_Channel}_{d,i}^{p} = L_{d,i}^{p} \qquad \text{Equation 6}$$

$$\sum_{p=1}^{P} C_{d,i}^{p} - \sum_{p=1}^{P} PV_{d,i}^{p} = \qquad \text{Equation 7}$$

$$\sum_{p=1}^{P} \text{Intake}_{Channel_{d,i}^{p}} \sum_{p=1}^{P} \text{Offtake\_Channel}_{d,i}^{p} = \sum_{p=1}^{P} L_{d,i}^{p} = L_{d,i}^{BiDir}$$

$$C_{d,i} - PV_{d,i} = L_{d,i}^{BiDir} \qquad \text{Equation 8}$$

Where, $$C_{d,i}^{p}$$

is unobserved endpoint (p) power consumption on day (d) and time interval (i);

$$PV_{d,i}^{p}$$

is unobserved endpoint (p) solar PV generation on day (d) and time interval (i);

$C_{d,i}$ is unobserved power consumption on day (d) and time interval (i); and $PV_{d,i}$ is unobserved distributed solar PV generation on day (d) and time interval (i).

With distributed solar PV the relationship between consumption and loads is masked by solar PV generation. For example, measured loads will go up when endpoint consumption goes up, endpoint solar PV generation goes down, or any combination of endpoint consumption and solar PV generation changes that lead to a net increase in measured loads. Conversely, measured loads will go down when endpoint consumption goes down, endpoint solar PV generation goes up, or any combination of endpoint consumption and solar PV generation changes that lead to a net decrease in measured loads. This means both measures of $$-L_{d,i}^{BiDir}$$

and $$L_{d,i}^{SCADA} -$$

are a function of endpoint solar PV generation and consumption. The exact functional form of this relationship is masked since the only available measurements are of the net difference between consumption and solar PV generation. This can be expressed as:

$$L_{d,i}^{SCADA} = L_{d,i}^{BiDri} = \emptyset(C_{d,i}, PV_{d,i}) \qquad \text{Equation 9}$$

Under a strong assumption that the function $\emptyset(_{d,i}, SPV_{d,i})$ is linear with respect to consumption and solar PV generation, measured loads can be approximated as follows:

$$L_{d,i}^{SCADA} = L_{d,i}^{BiDri} = C_{d,i} - PV_{d,i} \qquad \text{Equation 10}$$

Example of Load Forecast Instability

Real-time load forecast models are designed to provide accurate forecasts of load over forecast horizons of minutes-ahead to several hours-ahead. In most control rooms, real-time SCADA measurement of load is available to the load forecast models every five minutes. In general, there is high correlation between loads that are five to 60 minutes apart. To exploit this relationship, real-time load forecast models are designed to leverage autoregressive load components. For example, the forecast model for loads at 10:45 AM will be designed to be a function of loads at 10:40 AM, 10:35 AM, 10:30 AM. A simple example of an autoregressive load forecast model for loads at 10:45 AM is presented below.

$$L_{10:45} = \qquad \text{Equation 11}$$
$$\beta_0^{10:45} + \beta_1^{10:45} L_{10:40} + \beta_2^{10:45} L_{10:35} + \beta_3^{10:45} L_{10:30} + e_{10:45}$$

The average relationship between load at 10:45 AM and load at 10:40 AM is captured by the estimated value of the parameter, $$\beta_1^{10:45}.$$

The average relationship between load at 10:45 AM and load at 10:35 AM is captured by the estimated value of the parameter, $$\beta_2^{10:45}.$$

The average relationship between load at 10:45 AM and load at 10:30 AM is captured by the estimated value of the parameter, $$\beta_3^{10:45}$$

On average, the above equation will provide an accurate forecast of loads at 10:45 AM given SCADA measurements of loads at 10:40 AM, 10:35 AM and 10:30 AM.

In a similar fashion the forecast models for load at 10:50 AM, 10:55 AM, and 11:00 AM can be written as:

$$L_{10:50} = \beta_0^{10:50} + \beta_1^{10:50} L_{10:45} + \quad\quad \text{Equations 12 through 14}$$
$$\beta_2^{10:50} L_{10:40} + \beta_3^{10:50} L_{10:35} + e_{10:50}$$
$$L_{10:55} = \beta_0^{10:55} + \beta_1^{10:55} L_{10:50} +$$
$$\beta_2^{10:55} L_{10:45} + \beta_3^{10:55} L_{10:40} + e_{10:55}$$
$$L_{11:00} = \beta_0^{11:00} + \beta_1^{11:00} L_{10:55} +$$
$$\beta_2^{11:00} L_{10:50} + \beta_3^{11:00} L_{10:45} + e_{11:00}$$

With increased penetration of distributed solar PV generation, the SCADA measurement of loads at 10:40 AM, 10:35 AM, and 10:30 AM are impacted by prevailing solar conditions during the 15-minute interval from 10:30 AM to 10:45 AM. Under stable solar (and cloud) conditions, the relationship between loads at 10:45 AM and the prior three SCADA measurements will reflect average consumption behavior. In contrast, under unstable solar (and cloud) conditions, the relationship breaks down due to volatility in the SCADA measurements driven by unstable solar PV generation.

Consider an example where a heavy cloud bank passes over the region at 10:40 AM. This will lead to a jump in loads at 10:40 AM that reflects the reduction of solar PV generation. Assuming the estimated value for $$\beta_1^{10:45}$$

is positive, the forecast for load at 10:45 AM will be higher than what would normally be expected given underlying consumption behavior. Assuming positive correlation among all morning intervals, the jump up in the forecast for load at 10:45 AM will lead to an increase in the load forecast for loads at 10:50 AM, 10:55 AM, and 11:00 AM.

Continuing the example, assume the cloud bank clears out by 10:45 AM. This will lead to a 10:45 AM load measurement lower than the five minute ahead forecast made for 10:45 AM at 10:40 AM. The lower 10:45 AM load will then lead to lower forecasts for loads at 10:50 AM, 10:55 AM, and 11:00 AM. As a result of the cloud bank, two very different forecasts for loads at 11:00 AM are generated. Both reflect changes in solar PV generation and not changes in the underlying consumption.

Improving Load Forecast Stability

Smoothing the load data prior to generating a load forecast improves the stability of the forecasts that are produced. For time series data, applying a centered moving average of the load data represents one form of data smoothing. A centered moving average can be expressed as, $$CMA\_L_{d,i} = \left( \sum_{j=0}^{(J-1)/2} L_{d,i-j} + \sum_{j=1}^{(J-1)/2} L_{d,i+j} \right) / (J+1) \quad \text{Equation 15}$$

Here,

CMA_$L_{d,i}$ is the Centered Moving Average of load on day (d) and time interval (i); and (J) is the width of the smoothing window.

For example, a 5-point (J=5) centered moving average would be the average of the sum: $L_{d,i-2} + L_{d,i-1} + L_{d,i} + L_{d,i+1} + L_{d,i+2}$. In this case each data point in the sum is given equal weight. For time series that are close to linear an equal weighting scheme preserves the linearity of the relationship among the data points. For time series that is nonlinear, like load and solar data, an equal weighted centered moving average will result in a smoothed time series that is flatter than the original time series. Haar Wavelets and Savitzky-Golay Filters are two examples of centered moving averages that preserve the curvature of a time series like load and solar PV generation data.

An example of a centered moving average that preserves the relative curvature of the original time series can be expressed as:

$$\text{Equation 16}$$
$$CMA\_L_{d,i} =$$
$$\left( \sum_{j=0}^{(J-1)/2} \omega_{i-j} L_{d,i-j} + \sum_{j=1}^{(J-2)/2} \omega_{i+j} L_{d,i+j} \right) / \left( \sum_{j=0}^{(J-1)/2} \omega_{i-j} + \sum_{j=1}^{(J-2)/2} \omega_{i+j} \right)$$

Where,

CMA_$L_{d,i}$ is the curvature preserved smoothed load value on day (d) and time interval (i); and $\omega_{i-j}$ and $\omega_{i+j}$ are smoothing weights that preserve curvature of the original time series.

Figure 3:
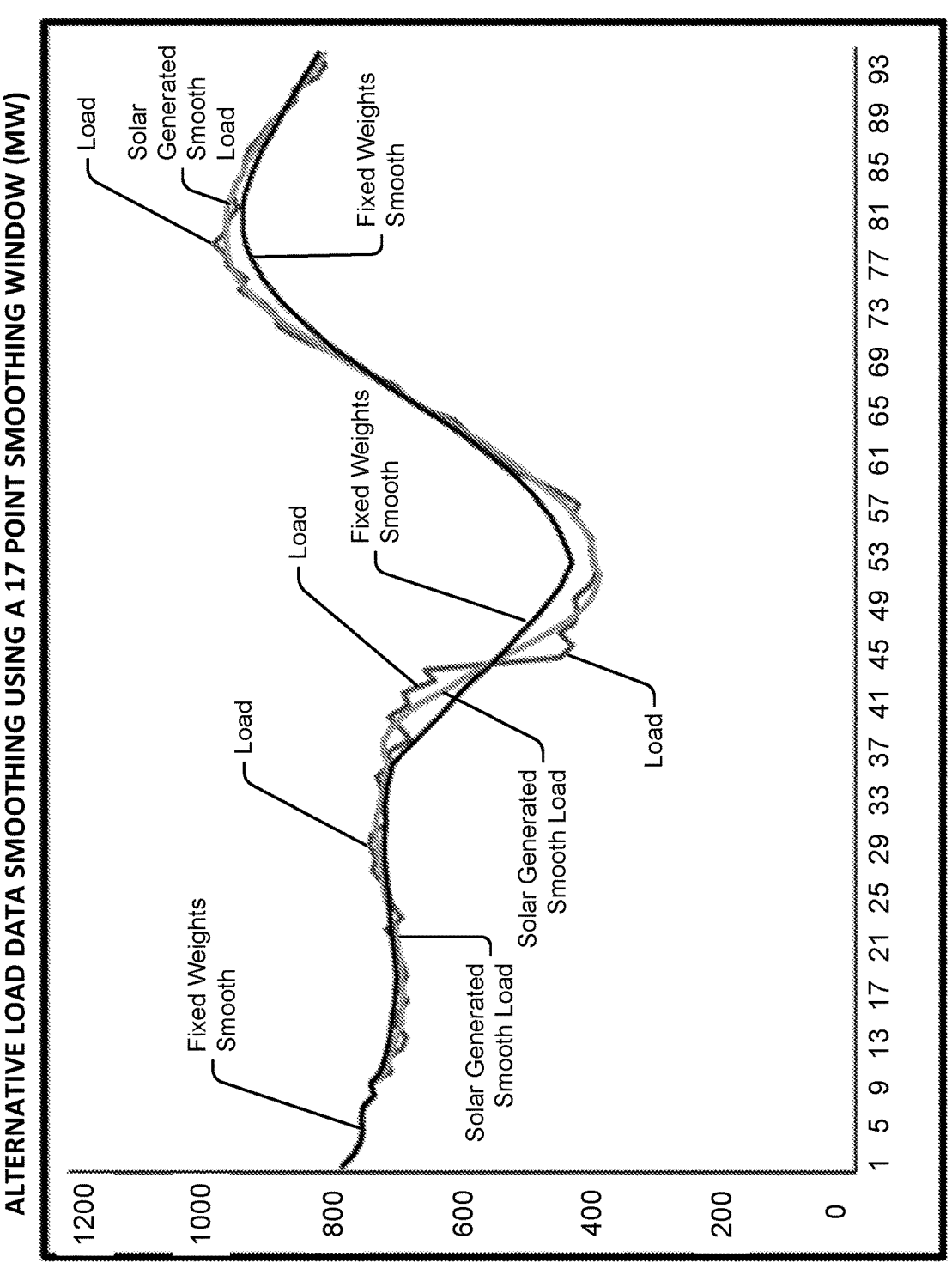
FIG. 3 is a chart showing alternative load data smoothing using a 17-point smoothing window.

FIG. 3 shows a comparison of load data smoothing using an equal weighted versus a Savitzky-Golay polynomial weighted centered moving average. In this figure the size of the smoothing window is 17 points; 8 points prior to the centered point, the centered point, and 8 points after the centered point. This example illustrates the power of a curvature preserving weighting scheme for constructing a smoothed load data series that follows the curvature of actual loads. The equal weighted centered moving average leads to a more linear time series. In general, narrow (small J) smoothing windows will follow more closely load variations than wider smoothing windows. There is a tradeoff between employing wide (large J) smoothing windows to achieve forecast stability versus loss of forecast accuracy due to the load forecast models launching off potentially dampened load values.

Endpoint Challenge. The challenge with applying Centered Moving Average smoothing to real-time time series occurs with the most recent observation. Consider the example where the most recent real-time load measurement is for 08:15 AM. Applying a 5 Point centered moving average to the data yields:

$$sL_{08:15} = \frac{L_{07:45} + L_{08:00} + L_{08:15} + \hat{L}_{08:30} + \hat{L}_{08:45}}{5} \quad \text{Equation 17}$$

Here, sL$_{08:15}$ is the centered moving average value for time interval (08:15);

L$_{07:45}$ is actual load for time interval (07:45);

L$_{08:00}$ is actual load for time interval (08:00);

L$_{08:15}$ is actual load for time interval (08:15);

L̂$_{08:30}$ is an estimated value for unmeasured load for time interval (08:30); and L̂$_{08:45}$ is an estimated value for unmeasured load for time interval (08:45).

In this case, since the last measured load is for time interval (08:15), to complete the centered moving average estimated values for 08:30 and 08:45 are required. One option is to assume the future values take on zero values. This gives:

$$sL_{08:15} = \frac{L_{07:45} + L_{08:00} + L_{08:15} + 0 + 0}{3} \qquad \text{Equation 18}$$

The downside of this approach is, during the ramping up periods of the morning hours, the truncated smoothed values will be consistently below the actual values. During the ramping down periods of the evening, the truncated smoothed values will be consistently above the actual values. This type of systematic bias leads to under projecting morning loads and over projecting evening loads.

Figure 4:
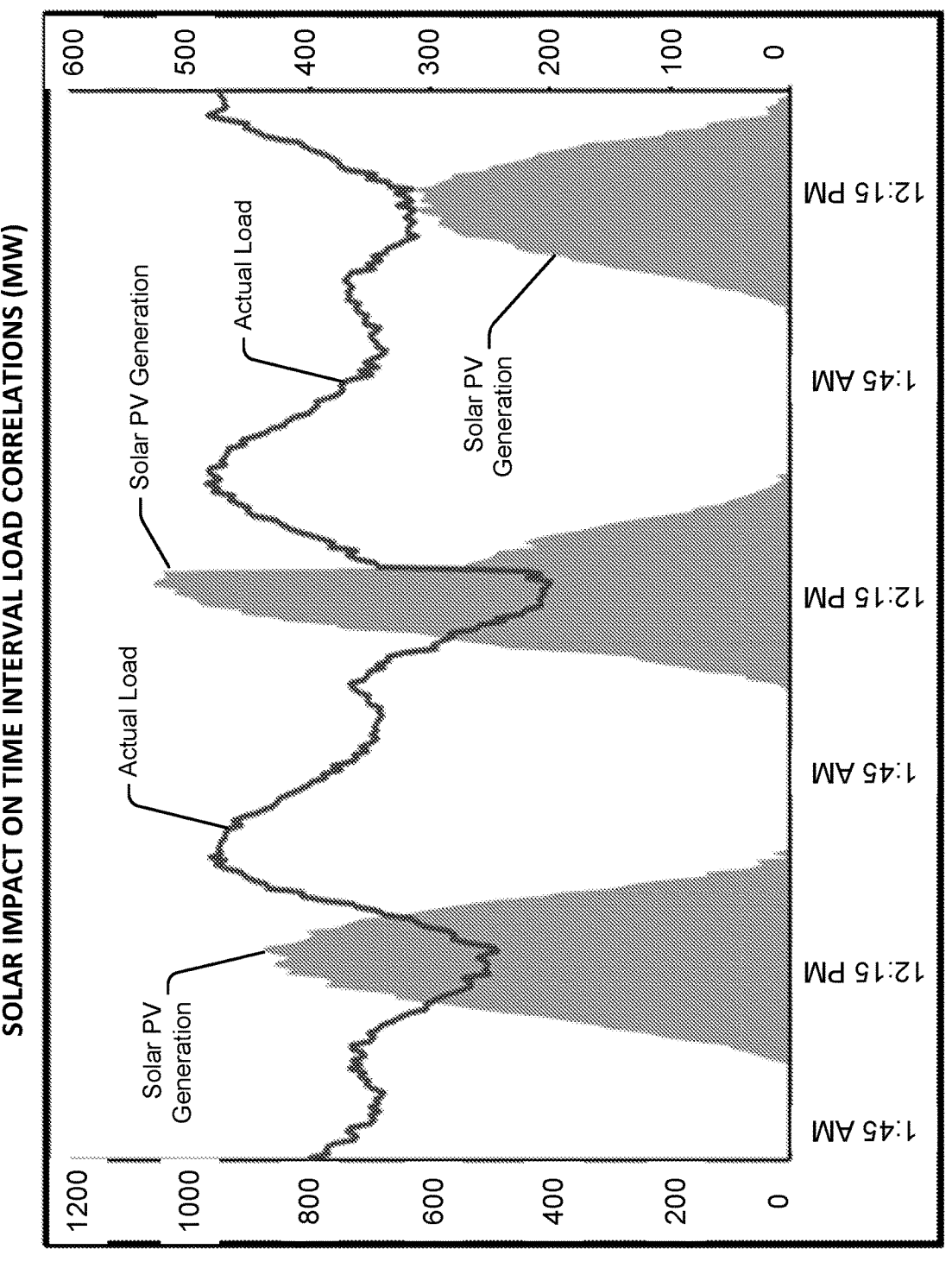
FIG. 4 is a chart showing a 3-day window and solar impact on time interval load correlations.

Volatile Autocorrelation Challenge. In addition to the endpoint challenge of smoothing real-time load data, the presence of volatile solar PV generation complicates inclusion of autoregressive load terms in the real-time load forecast models. FIG. 4 shows three days of load and solar PV generation are graphed. Even if underlying consumption of power does not change, the relationship between loads from one time interval to another varies with levels of solar PV generation. This suggests that a fixed set of estimated coefficients on a model's autoregressive terms will be good on average, but potentially very wrong on any specific day. Returning to the autoregressive model introduced earlier, this suggests that the estimated values for model coefficients will capture the average correlation between loads at 10:45 and loads at 10:40, 10:35, and 10:30. Further, the estimated value for the intercept term, $$\beta_0^{10:45},$$

will reflect average loads at 10:45 over the model estimation range. As can be seen in the figure, an autoregressive model specification that captures the average relationship among the autoregressive terms is too restrictive to capture the load volatility driven by volatile solar PV generation.

Summary. It has been demonstrated that deep penetration of distributed solar PV generation leads to load volatility that is translated into forecast instability. Further, distributed solar PV generation alters the correlation among loads compromising the power of autoregressive load terms that are included in a real-time load forecast model. The algorithm presented below is designed to provide a stable sequency of real-time load forecasts while preserving the use of autoregressive terms in the real-time forecast model specifications.

Two Stage Ensemble Smoothing Algorithm

Since power consumption is not measured directly and, in most situations, neither is distributed solar PV generation, estimates of consumption are based on strong assumptions about the functional relationship between consumption, measured loads, and solar PV generation. This means consumption estimates reflect both variations in loads (which in part reflects variations in consumption behavior), as well as variations in solar PV generation. It is anticipated that during the sunlight hours of a day, changes in consumption behavior will evolve less rapidly than variations in solar PV generation. This will be particularly evident on partially cloudy days where solar PV generation will cut in and out with cloud movement. Rapid movement of solar PV generation manifests itself in volatile load measurements. With increased saturation of embedded solar PV generation, the frequency and order of magnitude of measured load volatility grows. The following algorithm smooths through the load volatility that is associated with solar PV generation while leaving in place underlying power consumption patterns. The algorithm builds on the idea that load data embody the impact of both instantaneous cloud cover movements and rolling average cloud conditions for the hours leading up to the period of analysis. Prevailing or rolling average cloud cover will be reflected in relatively stable average load levels. Instantaneous deviations of cloud conditions from rolling average conditions are reflected in load values that spike up or spike down relative to the rolling average load values. Building on the distinction between rolling average cloud cover that impacts average loads versus instantaneous cloud deviations that lead to load data spikes (up or down) solar PV generation can be expressed as:

$$PV_{d,i} = \overline{PV}_{d,i} + \nabla PV_{d,i} \qquad \text{Equation 19}$$

Here, $PV_{d,i}$ is distributed solar PV generation for day (d) and time interval (i);

$\overline{PV}_{d,i}$ is the average solar PV generation expected for day (d) and time interval (i) based on a rolling average cloud cover; and $\nabla PV_{d,i}$ is the deviation of solar PV generation from what is expected given instantaneous deviations on day (d) and time interval (i) in cloud cover from the rolling average cloud cover.

Figure 5:
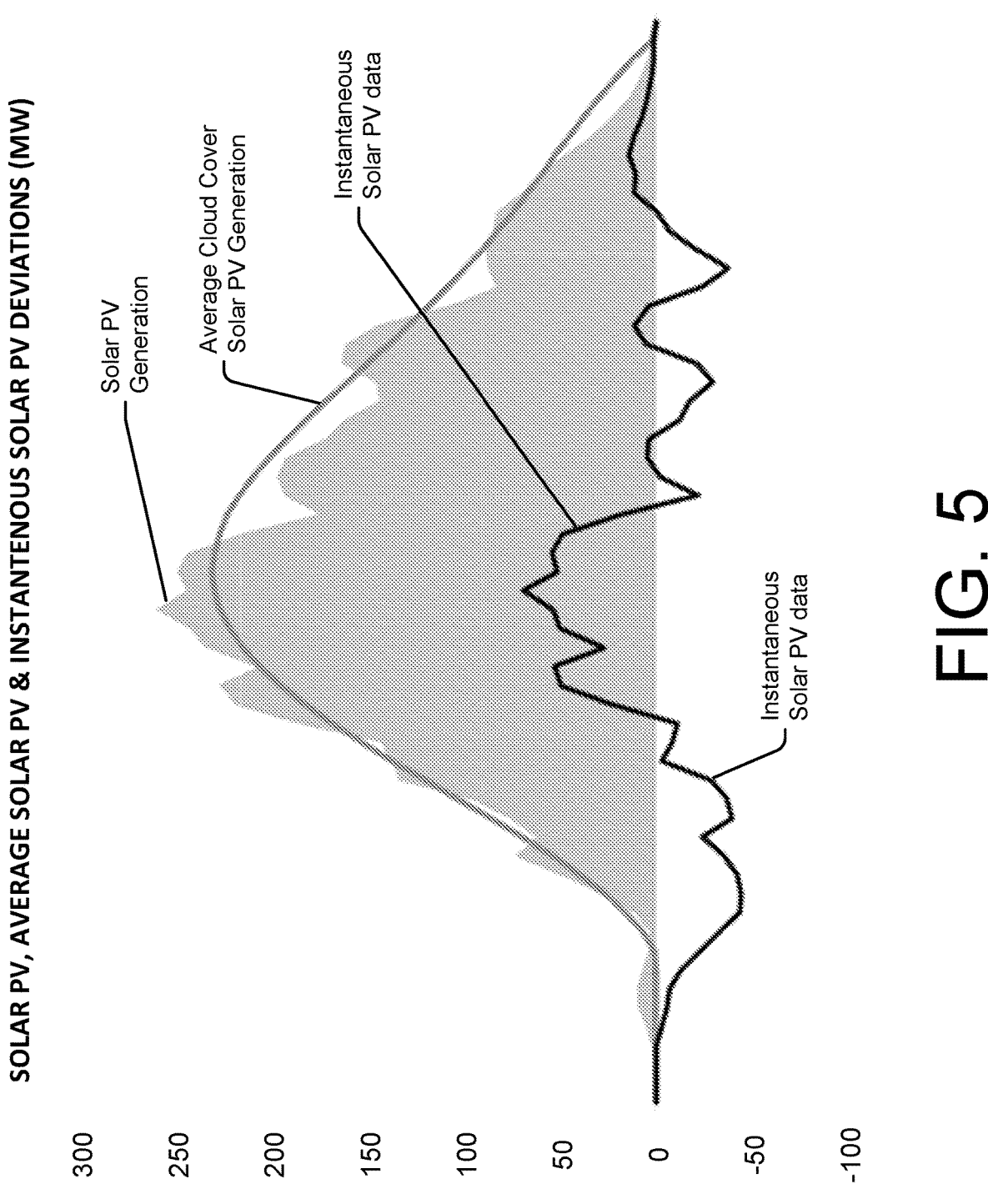
FIG. 5 is a chart showing solar PV, average solar PV, and instantaneous solar PV deviations.

FIG. 5 shows an example of the estimated average distributed solar PV generation and the corresponding instantaneous deviation of solar PV generation.

Given this definition of solar PV generation we can write:

$$L_{d,i} = C_{d,i} - PV_{d,i} \qquad \text{Equation 20}$$

Or $$L_{d,i} = C_{d,i} - \left(\overline{PV}_{d,i} + \nabla PV_{d,i}\right) \qquad \text{Equation 21}$$

Here, $L_{d,i}$ is load on day (d) and time interval (i): and $C_{d,i}$ is power consumption on day (d) and time interval (i).

Rearranging terms gives Equation 22:

$$L_{d,i} = \left(C_{d,i} - \overline{PV}_{d,i}\right) - \nabla PV_{d,i}$$

The first two elements on the right-hand side of Equation 22 provide an estimate of loads under rolling average cloud conditions. The third element on the right-hand side captures the load variation that results from instantaneous deviations of cloud conditions from the rolling average cloud conditions. This later element drives a distributed portion of load variation on cloudy days. By construction, estimates of $\overline{PV}_{d,i}$ will be relatively smooth because they reflect slowly evolving cloud conditions. The purpose of the smoothing algorithm is to reduce and if possible, eliminate the load variation driven by $[\nabla PV_{d,i}]$. The steps are listed below. The figures illustrate the steps in the algorithm.

Step 1. Gather Load and Solar PV Data

Figure 6:
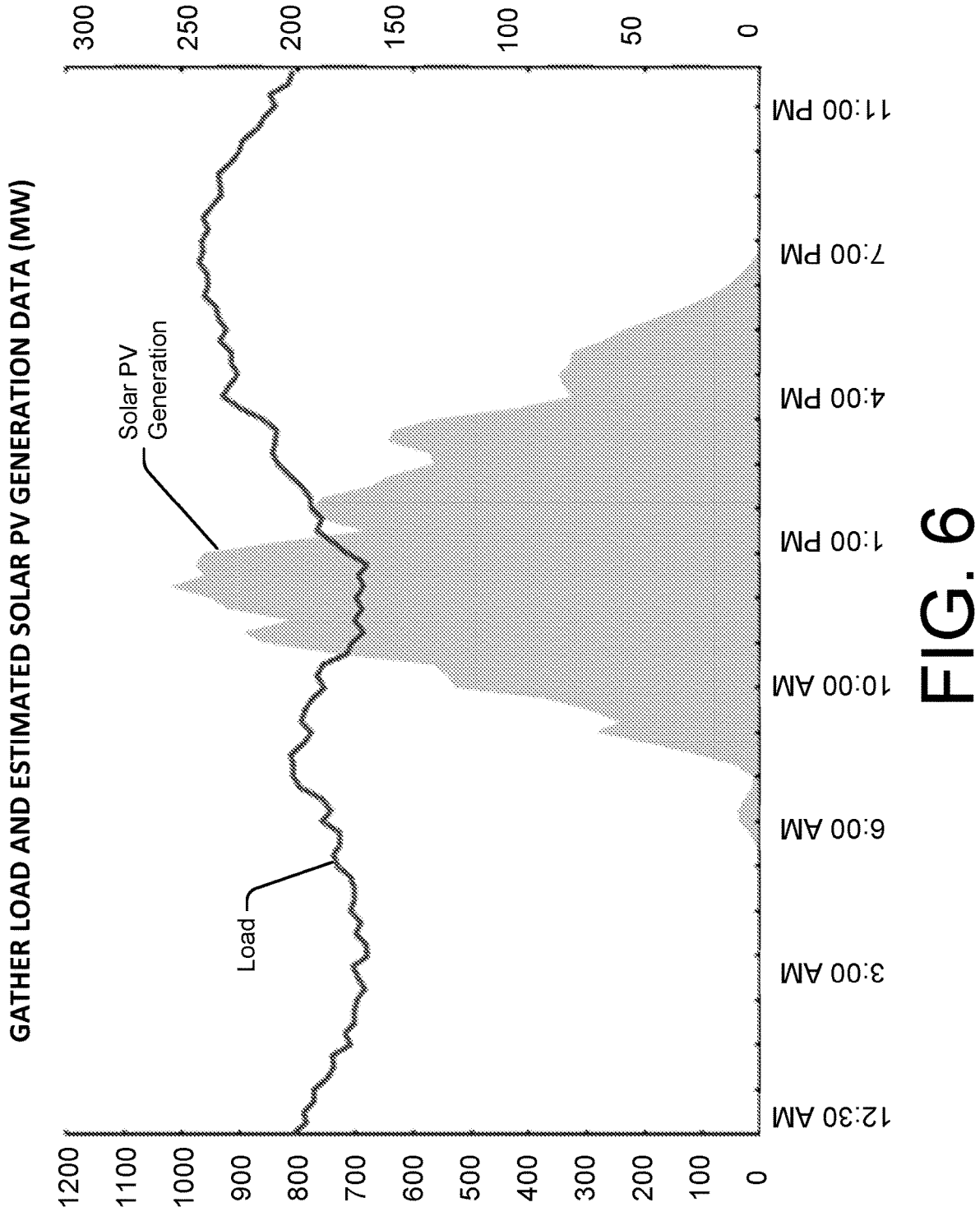
FIG. 6 is a chart showing gathered load and estimated solar PV generation data.

Under this step, measured load and estimates of distributed solar PV generation are gathered. An example of the type of data that are collected is presented in FIG. 6. If the analysis day is in the forecast period, then forecasts of distributed solar PV generation are used to fill the gap when actual solar PV estimates are not available.

Step 2. Compute Average Cloud Cover Solar PV Generation

This step develops estimates of distributed solar PV generation under prevailing or rolling average cloud conditions. These estimates are formed by taking a weighted average of alternative curvature preserving centered moving average filters of the raw solar PV time series. For this application the filters should be of different sized smoothing windows, from narrow windows that provide very little smoothing to wide smoothing windows that provide significant smoothing. In principle, on clear sky or steady cloud cover conditions narrow smoothing windows work well since the volatile portion of the solar PV generation $[\nabla PV_{d,i}]$ will be close to zero leading to a relatively smooth time series of solar PV generation. On partially cloudy days wider smoothing windows are needed since the volatile portion of the solar PV generation time series will be larger than clear or steady cloud days.

The solar data filtering is applied one day at a time to allow solar panel efficacy to vary across time-of-day and season. If the current day is a day in the forecast period, then forecasted solar PV generation values are used to fill the gaps when actual solar PV generation values are missing.

Step 2.1 Import Clear Sky Solar Irradiance

Figure 7:
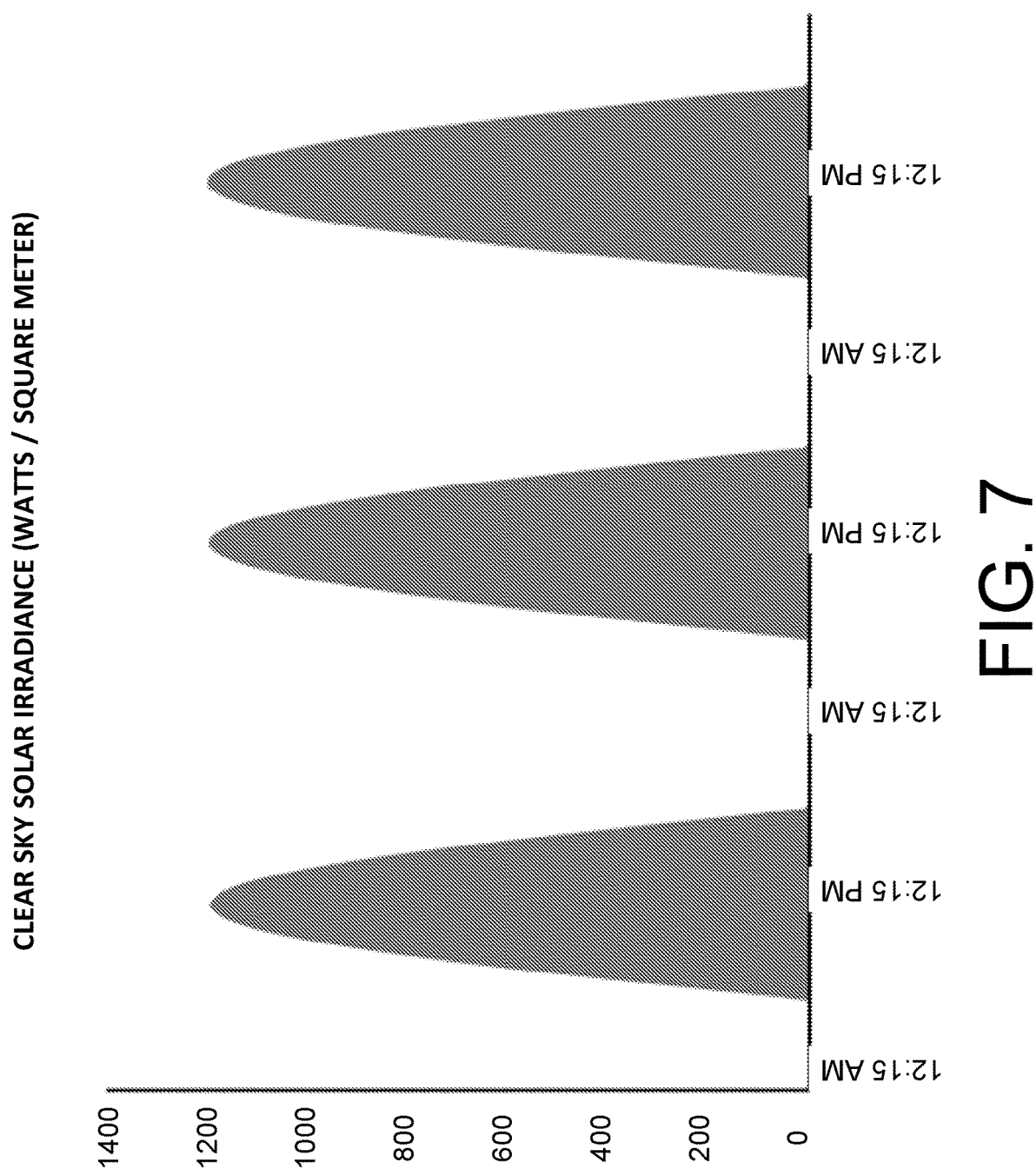
FIG. 7 is a chart showing clear sky solar irradiance over a 3-day period.

Under this step, estimates of Clear Sky Solar Irradiance are imported into the algorithm. The clear sky solar irradiance is defined for the location (i.e., latitude and longitude) and day of the year for the electrical load zone being analyzed. A source for clear sky solar irradiance is the NOAA Solar Calculator. FIG. 7 shows an example of clear sky solar irradiance.

Step 2.2 Compute Ensemble of Centered Moving Average Filters

Under this step, an ensemble of curvature preserving centered moving average filters are applied to the solar PV generation data (forecasts) for a day. Specifically, Equation 23

$$\hat{PV}_{d,i}^{J} =$$

$$\left( \sum_{j=0}^{(J-1)/2} \omega_{-j}^{J} PV_{d,i-j} + \sum_{j=1}^{(J-2)/2} \omega_{j}^{J} PV_{d,i+j} \right) \left( \sum_{j=0}^{(J-1)/2} \omega_{-j}^{J} + \sum_{j=1}^{J/2} \omega_{j}^{J} \right)$$

Where, $\hat{PV}_{d,i}^{J}$ is the estimate of average solar PV generation on day (d) and time interval (i) using smoothing window of width J;

$$\omega_{-j}^{J}$$

and $$\omega_{j}^{J}$$

are curvature preserving smoothing weights for smoothing window of width J; and

J is the width of the smoothing window.

Step 2.3 Remove Erroneous Non-Zero Solar PV Estimates

This step ensures the estimates of average solar PV generation from Step 2.2. are non-negative and take on a value of zero when clear sky solar irradiance for the day is zero.

$$\hat{PV}_{d,i}^{J} = \begin{cases} 0, & \hat{PV}_{d,i}^{J} < 0 \\ 0, & ClearSkyIrradiance_{d,i} \le 0 \end{cases}$$   Equation 24

Where,

ClearSkyIrradiance$_{d,i}$ is clear sky irradiance for day (d) and time interval (i).

Step 2.4 Compute an Ensemble Average

Under this step, an estimate of average solar PV generation is computed as weighted average of the ensemble of centered moving average estimates from Step 2.3.

$$\overline{PV}_{d,i} = \sum_{j=1}^{J} \mu_{d}^{j} \hat{PV}_{d}^{j} / \sum_{j=1}^{J} \mu_{d}^{j}$$   Equation 25

Here, $\overline{PV}_{d,i}$ is the estimated average distributed solar PV generation for day (d) and time interval (i); and $$\mu_{d}^{J}$$

is the weight placed on the smoothed estimate derived using smoothing window J.

The sum of the weights, $$\mu_{d}^{J},$$

equal 1.0 and are computed in Step 2.4.1.

Step 2.4.1 Compute Ensemble Smoothing Weights

The ensemble weights are designed such that the time series of smoothed solar PV generation $$\left( \hat{PV}_{d}^{j} \right)$$

that are similar in smoothness as clear sky solar irradiance are assigned most weight. Similarity is defined as the ratio of the sum of the squared second order derivative of a normalized smoothed solar PV generation time series to the sum of the squared second order derivative of normalized clear sky solar irradiance. This sum is computed in steps.

Step 2.4.1.A. Compute Normalized Time Series. Under this sub step, the clear sky solar irradiance from Step 2.1 and each smoothed time series from Step 2.3 are normalized to sum to 1.0 across all time intervals of a day. Specifically, $$\text{Norm\_ClearSky}_{d,i} = \qquad\qquad\qquad \text{Equation 26}$$
$$\text{ClearSkyIrradiance}_{d,i} \Big/ \sum_{i=1}^{I} \text{ClearSkyIrradiance}_{d,i}$$

$$\text{Norm\_}\widehat{PV}_{d,i}^{j} = \widehat{PV}_{d,i}^{j} \Big/ \sum_{i=1}^{I} \widehat{PV}_{d,i}^{j} \qquad \text{Equation 27}$$

Where,

ClearSkyIrradiance$_{d,i}$ is clear sky irradiance for day (d) and time interval (i);

Norm_ClearSky$_{d,i}$ is normalized clear sky irradiance for day (d) and time interval (i), time intervals (i) run from 1 to I;

$$\widehat{PV}_{d,i}^{j}$$

is smoothed estimated solar PV generation on day (d), time interval (i), and smoothing method (j), smoothing methods (j) run from 1 to J; and $$\text{Norm\_}\widehat{PV}_{d,i}^{j}$$

is normalized smoothed estimated solar PV generation on day (d), time interval (i), and smoothing method (j).

Step 2.4.1.B. Compute 1st Order Derivatives. Under this sub step, numerical first order derivatives of the normalized time series from Step 2.4.1.A are computed as follows:

$$\text{Norm\_ClearSky}_{d,i}' = \qquad\qquad\qquad \text{Equation 28}$$
$$\left(\text{Norm\_ClearSky}_{d,i+1} - \text{Norm\_ClearSky}_{d,i-1}\right)/2$$

$$\text{Norm\_}\widehat{PV}_{d,i}^{j\prime} = \left(\text{Norm\_}\widehat{PV}_{d,i+1}^{j} - \text{Norm\_}\widehat{PV}_{d,i-1}^{j}\right)/2 \qquad \text{Equation 29}$$

Step 2.4.1.C. Compute 2nd Order Derivatives. Under this sub step, numerical second order derivatives of the normalized time series from Step 2.4.1.A are computed as follows:

$$\text{Norm\_ClearSky}_{d,i}'' = \qquad\qquad\qquad \text{Equation 30}$$
$$\left(\text{Norm\_ClearSky}_{d,i+1}' - \text{Norm\_ClearSky}_{d,i-1}'\right)/2$$

$$\text{Norm\_}\widehat{PV}_{d,i}^{j\prime\prime} = \left(\text{Norm\_}\widehat{PV}_{d,i+1}^{j\prime} - \text{Norm\_}\widehat{PV}_{d,i-1}^{j\prime}\right)/2 \qquad \text{Equation 31}$$

Step 2.4.1.D. Compute Similarity Weights. Under this sub step, a similarity weight is computed as follows:

$$\varphi_d^j = \sum_{i=1}^{I} \left(\text{Norm\_}\widehat{PV}_{d,i}^{j\prime\prime}\right)^2 \Big/ \left(\text{Norm\_ClearSky}_{d,i}''\right)^2 \qquad \text{Equation 32}$$

Here, $$\varphi_d^j$$

is the preliminary similarity weight for smoothing method (j) on day (d).

Step 2.4.1.E. Compute Normalized Similarity Weights. Under this sub step, normalized similarity weights for the ensemble of smoothing solar PV time series are computed as follows:

$$\gamma_d^j = \sum_{j=1}^{J} 1 - \left(\varphi_d^j \Big/ \left[\sum_{j=1}^{J} \varphi_d^j\right]\right) \qquad \text{Equation 33}$$

$$\mu_d^j = \gamma_d^j \Big/ \sum_{j=1}^{J} \gamma_d^j \qquad \text{Equation 34}$$

Here, $$\mu_d^j$$

is the final normalized similarity weight for smoothing method (j) on day (d); and $$\gamma_d^j$$

is the unnormalized similarity weight for smoothing method (j) on day (d).

Step 3. Create Smoothed Historical Power Consumption Estimates

This step develops estimates of consumption over the historical period. These estimates are formed by applying the smoothing methods and normalized similarity weights developed in Step 2 to estimates of reconstituted loads.

Step 3.1. Compute Estimates of Consumption in the Historical Period. Under this step, estimates of solar PV generation are added to measured load to form estimates of power consumption. Formally, estimates of power consumption are computed as:

$$\hat{C}_{d,i} = L_{d,i} + PV_{d,i} \qquad \text{Equation 35}$$

Here, $\hat{C}_{d,i}$ is estimated power consumption on day (d) and time interval (i);

$L_{d,i}$ is measured load on day (d) and time interval (i); and $PV_{d,i}$ is estimated solar PV generation on day (d) and time interval (i).

Figure 8:
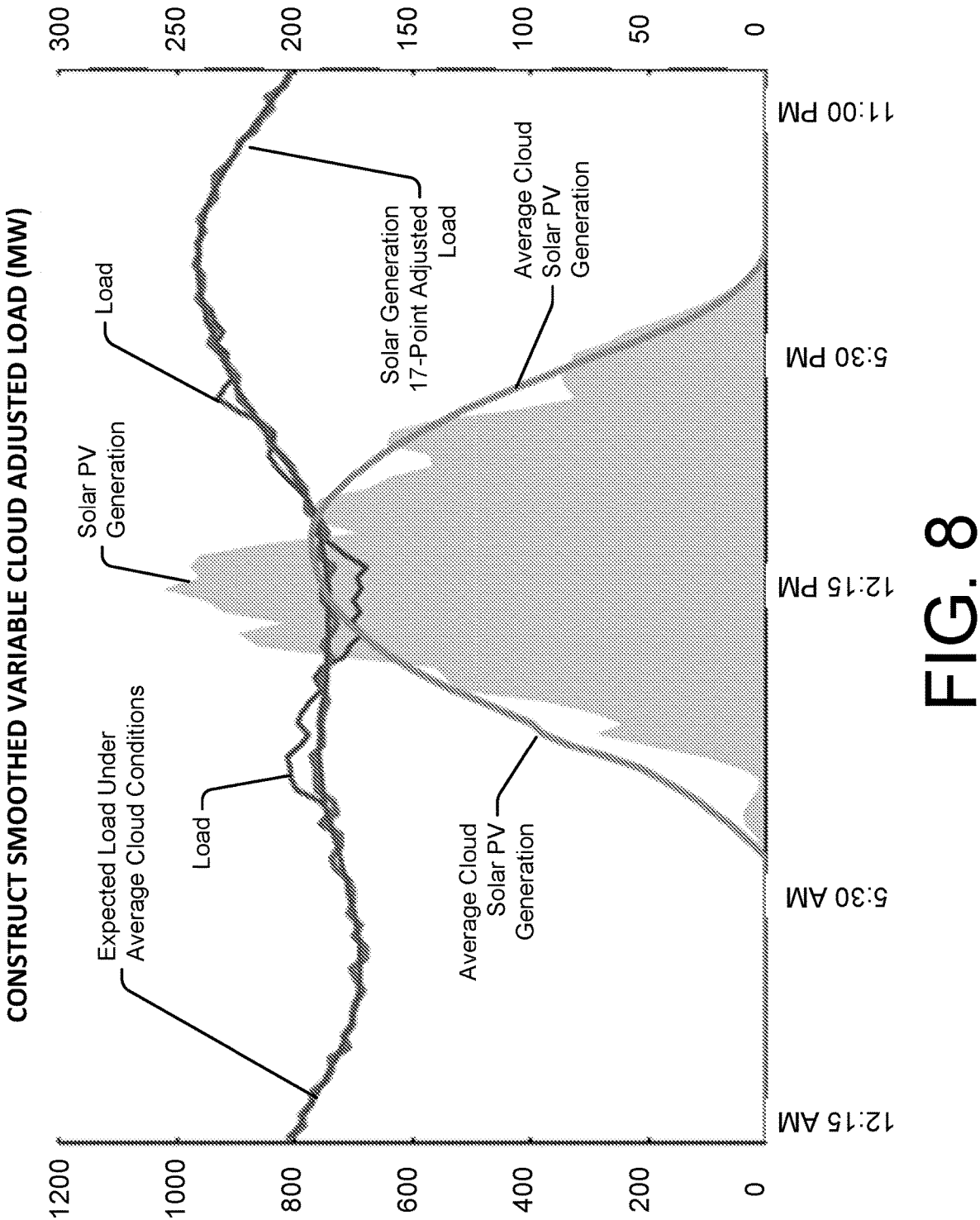
FIG. 8 is a chart showing an example construction of smoothed variable cloud adjusted load.

The result of this step is illustrated by the blue line in FIG. 8. Algorithm Step 3.

Step 3.2. Create Smoothed Consumption Estimates over the Historical Period. Under this step, the smoothing methods used under Step 2 are applied to the estimates of power consumption from Step 3.1. The goal is to smooth through the load variation associated with instantaneous deviations in solar PV generation. Specifically, $$s\hat{C}_{d,i}^J = \left( \sum_{j=0}^{(J-1)/2} \omega_{-j}^J \hat{C}_{d,i-j} + \sum_{j=1}^{(J-2)/2} \omega_j^J \hat{C}_{d,i+j} \right) \Big/ \qquad \text{Equation 36}$$

$$\left( \sum_{j=0}^{(J-1)/2} \omega_{-j}^J + \sum_{j=1}^{J/2} \omega_j^J \right)$$

Here, $$s\hat{C}_{d,i}^J$$

is the smoothed time series of estimated power consumption on day (d) and time interval (i) for smoothing method (J);

$$\omega_{-j}^J$$

and $$\omega_j^J$$

are the curvature preserving smoothing weights for smoothing window of length J; and J is the width of the smoothing window.

Step 3.3. Computed Weighted Average Smoothed Power Consumption.

Under this step, a weighted average estimate of smooth consumption is constructed.

$$s\hat{C}_{d,i} = \sum_{j=1}^{J} \mu_d^j s\hat{C}_{d,i}^J \qquad \text{Equation 37}$$

Here, $$\mu_d^j$$

is the weight placed on smoothing method (j) on day (d) which was derived in Step 2.4.1.E.

Step 4. Create Smoothed Real-Time Estimates of Power Consumption

This step develops estimates of real-time power consumption where future values of measured load are not available. These estimates are formed by applying the smoothing methods and normalized similarity weights developed in Step 2 to estimates of real-time reconstituted loads.

Step 4.1. Calibrate Candidate Forecast to Non-Solar Hour Consumption. On the current day of the forecast horizon, estimates of power consumption are available for the time periods leading up to and including the most recent measurement period. For example, if the current day is Wednesday, October 8th and the time is 08:01, consumption estimates will be available for all five-minute intervals prior to and including 08:00 of October 8th. This means the computation of a smoothed consumption estimate for 08:00 will be limited to just the left-hand side of the sum in the above equation. In this case, forecasts of future consumption values are used to fill the gaps where actual estimates of consumption are missing. Possible candidates for the consumption forecasts include the last published statistical consumption forecast and the consumption data for an historical day under similar weather, solar, and calendar conditions as the forecast day. To reduce the possibility of causing unexpected spikes in the smoothed consumption estimates, the candidate consumption forecast shape is calibrated to the consumption estimates for the most recent non-daylight period leading into the real-time forecast. Specifically, $$\overline{C}_{d,i}^F = \left[ \frac{\sum_{i=1}^{I} \hat{C}_{d,i}}{\sum_{i=1}^{I} C_{d,i}^F} \right] \times C_{d,i}^F \qquad \text{Equation 38}$$

Here, $$\overline{C}_{d,i}^F$$

is the calibrated candidate consumption forecast for day (d) and time interval (i);

$$C_{d,i}^F$$

is the uncalibrated candidate consumption forecast for day (d) and time interval (i);

$\hat{C}_{d,i}$ is estimated consumption for day (d) and time interval (i); and

I indexes the non-daylight hour intervals of day (d).

Step 4.2. Create Smoothed Consumption Estimates for the Forecast Period. Under this step, the calibrated candidate consumption forecast data are combined with the most recently available estimate consumption values to construct a smoothed estimated consumption time series for the period leading into and including the last load measurement. Specifically, $$s\overline{C}_{d,i}^J = \left( \sum_{j=0}^{(J-1)/2} \omega_{-j}^J \hat{C}_{d,i-j} + \sum_{j=1}^{(J-2)/2} \omega_j^J \overline{C}_{d,i}^F \right) \Big/ \qquad \text{Equation 39}$$

$$\left( \sum_{j=0}^{(J-1)/2} \omega_{-j}^J + \sum_{j=1}^{J/2} \omega_j^J \right)$$

Here, $$s\overline{C}_{d,i}^J$$

is the resulting smoothed time series of estimated power consumption on day (d) and time interval (i) for smoothing method J that relies on consumption forecast $$\overline{C}_{d,i}^F;$$

$$\bar{C}_{d,i}^F$$

is the calibrated consumption forecast for day (d) and time interval (i);

$$\omega_{-j}^J$$

and $$\omega_j^J$$

are the smoothing weights for smoothing method J; and
    J is the width of the smoothing window.
    Step 4.3. Created Weighted Average Smoothed Real-time Power Consumption Estimate. Under this step, a weighted average estimate of smooth consumption is constructed.

$$s\bar{C}_{d,i} = \sum_{j=1}^{J} \mu_d^j s\bar{C}_{d,i}^j \qquad \text{Equation 40}$$

Here, $$\mu_d^j$$

is the weight placed on smoothing method (j) on day (d) which was derived in Step 2.4.1.E.
Step 5. Create Smoothed Load Estimates
    Under this step, the smoothed estimated consumption data from Steps 3 & 4 are combined with the estimated average solar PV generation from Step 2 to form an estimate/forecast of measured load. Specifically in the historical period estimates of smoothed measured load are computed as:

$$s\hat{L}_{d,i} = s\hat{C}_{d,i} - \overline{PV}_{d,i} \qquad \text{Equation 41}$$

Where,
    $s\hat{L}_{d,i}$ is the smoothed measured load estimate for the historical period;
    $s\hat{C}_{d,i}$ is the smoothed consumption estimate for the historical period; and
    $\overline{PV}_{d,i}$ is the estimated average solar PV generation for the historical period.
Step 6. Create Smoothed Real-Time Load Forecasts
    Under this step, the smoothed real-time power consumption forecasts from Step 4 are combined with the forecasts of average solar PV generation from Step 2 to form a forecast of real-time measured loads. Specifically in the forecast period, forecasts of smoothed measured load are computed as:

$$s\bar{L}_{d,i}^F = s\bar{C}_{d,i}^F - \overline{PV}_{d,i}^F \qquad \text{Equation 42}$$

Where, $$s\bar{L}_{d,i}^F$$

is the smoothed forecast of measured load for the forecast period;

$$s\bar{C}_{d,i}^F$$

is the smoothed forecast of consumption for the forecast period; and $$\overline{PV}_{d,i}^F$$

is the forecast of average cloud cover solar PV generation for the forecast period.
Example Processor and Memory
    In some examples of the techniques discussed herein, the methods of operation may be performed by one or more application specific integrated circuits (ASIC) or may be performed by the general-purpose processor 202 utilizing software defined in computer-readable media. In the examples and techniques discussed herein, the memory 204 may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.
    As defined herein, computer-readable media includes non-transitory media, and does not include transitory media, such as modulated data signals and carrier waves, and/or other information-containing signals.
Example Methods and Operation
    FIGS. 9 and 10 show an example of the algorithm programming 210 of FIG. 2B. FIGS. 9A-C each show a view of a portion of a flowchart 900 describing management of spinning reserve in an electrical utility system having distributed solar photovoltaic (PV) generation. The description of FIGS. 9 and 10 cites the reference designators used in FIG. 2 as being one example of the aspects being described. However, FIGS. 9 and 10 indicate techniques that do not require the server and electrical grid of FIGS. 1 and/or 2. Additionally, FIGS. 9 and 10 describe an overview of the techniques developed in greater detail, including equations and discussion, in other locations in this document. Accordingly, the equations, discussion, and FIGS. 3-8 can be used to enable and implement the actions described in FIGS. 1, 2, 9 and 10.

Referring to FIG. 9A and block 902, data is obtained. FIG. 10 shows an example of such data acquisition.

At block 904, estimates of consumption 222 are calculated as a sum of measured load data 212 and estimates of distributed solar PV generation data 214.

At block 906, weighted smoothed estimates of distributed solar PV generation data 224 are calculated. Blocks 908 and 910 show an example of the calculation. At block 908, smoothed estimates of distributed solar PV generation data 226 are calculated by applying smoothing methods 230 to estimates of distributed solar PV generation data 214. At block 910, normalized similarity weights 228 are applied to the smoothed estimates of distributed solar PV generation data 226 to form weighted smoothed estimates of distributed solar PV generation data 224.

In the option of block 912, the normalized similarity weights 228 place greater weight on smoothing methods 230 that develop estimates of distributed solar photovoltaic generation data 214 that are similar to estimates of distributed solar PV generation data under clear sky conditions 218.

Referring to FIG. 9B and block 914, smoothed estimates of consumption data 232 are calculated. Blocks 916 and 918 show examples of the calculation. At block 916, smoothing methods 230 and normalized similarity weights 228 are applied to calculate estimates of consumption 222. At block 918, the smoothing methods 230 and normalized similarity weights 228 applied to the estimates of distributed solar PV generation data 214 were also used for calculating the smoothed estimates of consumption data 232.

At block 920, forecasts of real-time distributed solar PV generation data 234 are calculated. In the example of block 922, real-time forecasts of distributed solar PV generation data 234 includes combining forecasts of global horizontal solar irradiance 220 with estimates of installed distributed solar PV capacity data 216 to form the forecasts of real-time distributed solar PV generation data 234.

Referring to FIG. 9C and block 924, a stable sequence of forecasts of smoothed real-time consumption 236 is calculated, wherein the calculating is based at least in part on smoothed estimates of consumption data 232.

At block 926, a stable sequence of forecasts of real-time measured load 238 is calculated by subtracting forecasts of real-time distributed solar photovoltaic (PV) generation data 234 from the stable sequence of forecasts of smoothed real-time consumption 236.

At block 928, the spinning reserve 240 of the electricity grid 100 is managed based at least in part on factors comprising the stable sequence of forecasts of real-time measured load 238.

FIG. 10 shows example 1000 data collection techniques of block 902. In the example, the types of data used to manage spinning reserve include measured load data 1002, estimates of distributed solar PV generation data 1004, estimates of installed distributed solar PV capacity data 1006, estimates of distributed solar PV generation data under clear sky conditions 1008, and forecasts of global horizontal solar irradiance 1010.

Example Systems and Devices

The following examples of electric grid load forecasts with distributed photovoltaic generation are expressed as numbered clauses. While the examples illustrate a number of possible configurations and techniques, they are not meant to be an exhaustive listing of the systems, methods, and/or techniques described herein.

1. A method of managing a spinning reserve of an electricity grid, comprising: calculating or deriving a stable sequence of forecasts of smoothed real-time consumption, wherein the calculating or deriving is based at least in part on smoothed estimates of consumption data; calculating or deriving a stable sequence of forecasts of real-time measured load by subtracting forecasts of real-time distributed solar photovoltaic (PV) generation data from the stable sequence of forecasts of smoothed real-time consumption; and managing the spinning reserve of the electricity grid based at least in part on factors comprising the stable sequence of forecasts of real-time measured load.

2. The method of clause 1, wherein calculating or deriving forecasts of real-time distributed solar PV generation data comprises: combining forecasts of global horizontal solar irradiance with estimates of installed distributed solar PV capacity data to form the forecasts of real-time distributed solar PV generation data.

3. The method of clause 1, wherein calculating or deriving smoothed estimates of consumption data comprises: applying smoothing methods and normalized similarity weights to calculate estimates of consumption.

4. The method of clause 3, additionally comprising: calculating or deriving weighted smoothed estimates of distributed solar PV generation data, wherein the calculating or deriving comprises: calculating or deriving smoothed estimates of distributed solar PV generation data by applying smoothing methods to estimates of distributed solar PV generation data; and applying normalized similarity weights to the smoothed estimates of distributed solar PV generation data to form weighted smoothed estimates of distributed solar PV generation data.

5. The method of clause 4, wherein the smoothing methods and normalized similarity weights applied to the estimates of distributed solar PV generation data were also used for calculating or deriving the smoothed estimates of consumption data.

6. The method of clause 4, wherein the normalized similarity weights place greater weight on smoothing methods that develop the distributed solar photovoltaic generation data that are similar to estimates of distributed solar PV generation data under clear sky conditions.

7. The method of clause 3, additionally comprising: calculating or deriving estimates of consumption as a sum of measured load data and estimates of distributed solar PV generation data.

8. The method of clause 2, additionally comprising: obtaining the measured load data; obtaining the estimates of distributed solar photovoltaic (PV) generation data; obtaining estimates of installed distributed solar PV capacity data; obtaining estimates of distributed solar PV generation data under clear sky conditions; obtaining forecasts of global horizontal solar irradiance.

9. A system to manage a spinning reserve of an electricity grid, comprising: a processor; and a memory device, in communication with the processor, wherein the memory device contains instructions comprising: calculating or deriving a stable sequence of forecasts of smoothed real-time consumption, wherein the calculating or deriving is based at least in part on smoothed estimates of consumption data; calculating or deriving a stable sequence of forecasts of real-time measured load by subtracting forecasts of real-time distributed solar photovoltaic (PV) generation data from the stable sequence of forecasts of smoothed real-time consumption; and managing the spinning reserve of the electricity grid based at least in part on factors comprising the stable sequence of forecasts of real-time measured load.

10. The system of clause 9, wherein calculating or deriving forecasts of real-time distributed solar PV generation data comprises: combining forecasts of global horizontal solar irradiance with estimates of installed distributed solar PV capacity data to form the forecasts of real-time distributed solar PV generation data.

11. The system of clause 9, wherein calculating or deriving smoothed estimates of consumption data comprises: applying smoothing methods and normalized similarity weights to calculate estimates of consumption.

12. The system of clause 11, wherein the instructions are additionally configured for actions comprising: calculating or deriving weighted smoothed estimates of distributed solar PV generation data, wherein the calculating or deriving comprises: calculating or deriving smoothed estimates of distributed solar PV generation data by applying smoothing methods to estimates of distributed solar PV generation data; and applying normalized similarity weights to the smoothed estimates of distributed solar PV generation data to form weighted smoothed estimates of distributed solar PV generation data.

13. The system of clause 12, wherein the smoothing methods and normalized similarity weights applied to the estimates of distributed solar PV generation data were also used for calculating or deriving the smoothed estimates of consumption data.

14. The system of clause 12, wherein the normalized similarity weights place greater weight on smoothing methods that develop the distributed solar photovoltaic generation data that are similar to estimates of distributed solar PV generation data under clear sky conditions.

15. The system of clause 11, wherein the instructions are additionally configured for actions comprising: calculating or deriving estimates of consumption as a sum of measured load data and estimates of distributed solar PV generation data.

16. One or more non-transitory computer-readable media storing computer-executable instructions that, when executed by one or more processors, configure a computing device to perform acts comprising: calculating or deriving a stable sequence of forecasts of smoothed real-time consumption, wherein the calculating or deriving is based at least in part on smoothed estimates of consumption data; calculating or deriving a stable sequence of forecasts of real-time measured load by subtracting forecasts of real-time distributed solar photovoltaic (PV) generation data from the stable sequence of forecasts of smoothed real-time consumption; and managing the spinning reserve of the electricity grid based at least in part on factors comprising the stable sequence of forecasts of real-time measured load.

17. The computer-readable media of clause 16, wherein computing forecasts of real-time of distributed solar PV generation data comprises: combining forecasts of global horizontal solar irradiance with estimates of installed distributed solar PV capacity data to form the forecasts of real-time distributed solar PV generation data.

18. The computer-readable media of clause 16, wherein computing smoothed estimates of consumption data comprises: applying smoothing methods and normalized similarity weights to calculate estimates of consumption.

19. The computer-readable media of clause 18, additionally comprising: calculating or deriving weighted smoothed estimates of distributed solar PV generation data, wherein the calculating or deriving comprises: calculating or deriving smoothed estimates of distributed solar PV generation data by applying smoothing methods to estimates of distributed solar PV generation data; and calculating or deriving normalized similarity weights to the smoothed estimates of distributed solar PV generation data to form weighted smoothed estimates of distributed solar PV generation data.

20. The computer-readable media of clause 19, additionally comprising: wherein the smoothing methods and normalized similarity weights applied to the estimates of distributed solar PV generation data were also used for calculating or deriving the smoothed estimates of consumption data.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The words comprise, comprises, and/or comprising, when used in this specification and/or claims specify the presence of stated features, devices, techniques, and/or components. The words do not preclude the presence or addition of one or more other features, devices, techniques, and/or components and/or groups thereof.

The invention claimed is:

1. A method of managing a spinning reserve of an electricity grid, comprising:

deriving weighted smoothed estimates of distributed solar photovoltaic (PV) generation data, wherein the deriving the weighted smoothed estimates of distributed solar PV generation data comprises:

deriving smoothed estimates of distributed solar PV generation data by applying smoothing methods to estimates of PV generation data; and applying normalized similarity weights to the smoothed estimates of distributed solar PV generation data to form the weighted smoothed estimates of distributed solar PV generation data;

deriving a stable sequence of forecasts of smoothed real-time consumption, wherein the deriving the stable sequence of forecasts of smoothed real-time consumption is based at least in part on smoothed estimates of consumption data, and wherein the smoothed estimates of consumption data are derived by actions comprising:

applying smoothing methods and normalized similarity weights to derive estimates of consumption; and deriving a stable sequence of forecasts of real-time measured consumption by subtracting forecasts of the distributed solar PV generation data from the stable sequence of forecasts of smoothed real-time consumption; and

23 managing the spinning reserve of the electricity grid based at least in part on the stable sequence of forecasts of real-time measured consumption, wherein the managing comprises:

responsive to deriving the stable sequence of forecasts of real-time measured consumption, reducing the spinning reserve; and responsive to forecast instability, increasing spinning reserves.

2. The method of claim 1, wherein the forecasts of real-time the distributed solar PV generation data are derived by actions comprising:

combining forecasts of global horizontal solar irradiance with estimates of installed distributed solar PV capacity data to form the forecasts of real-time the distributed solar PV generation data.

3. The method of claim 1, wherein the smoothing methods applied to the estimates of PV generation data and the normalized similarity weights applied to the smoothed estimates of distributed solar PV generation data were also used for deriving the smoothed estimates of consumption data.

4. The method of claim 1, wherein the normalized similarity weights applied to the smoothed estimates of distributed solar PV generation data are based at least in part on estimates of distributed solar PV generation data under clear sky conditions.

5. The method of claim 1, additionally comprising:

deriving estimates of consumption as a sum of measured consumption data and estimates of distributed solar PV generation data.

6. The method of claim 5, additionally comprising:

obtaining the measured consumption data;

obtaining the estimates of distributed solar PV generation data;

obtaining estimates of installed distributed solar PV capacity data;

obtaining estimates of distributed solar PV generation data under clear sky conditions; and obtaining forecasts of global horizontal solar irradiance.

7. A system to manage a spinning reserve of an electricity grid, comprising:

a processor; and a memory device, in communication with the processor, wherein the memory device contains instructions comprising:

deriving weighted smoothed estimates of distributed solar photovoltaic (PV) generation data, wherein the deriving the weighted smoothed estimates of distributed solar PV generation data comprises:

deriving smoothed estimates of distributed solar PV generation data by applying smoothing methods to estimates of PV generation data; and applying normalized similarity weights to the smoothed estimates of distributed solar PV generation data to form the weighted smoothed estimates of distributed solar PV generation data; and deriving a stable sequence of forecasts of smoothed real-time consumption, wherein the deriving the stable sequence of forecasts of smoothed real-time consumption is based at least in part on smoothed estimates of consumption data, and wherein the smoothed estimates of consumption data are derived by actions comprising:

applying smoothing methods and normalized similarity weights to derive estimates of consumption;

deriving a stable sequence of forecasts of real-time measured consumption by subtracting forecasts of the distributed solar PV generation data from the stable sequence of forecasts of smoothed real-time consumption; and managing the spinning reserve of the electricity grid based at least in part on the stable sequence of forecasts of real-time measured consumption, wherein the managing comprises:

responsive to deriving the stable sequence of forecasts of real-time measured consumption, reducing the spinning reserve; and responsive to forecast instability, increasing spinning reserves.

8. The system of claim 7, wherein the instructions further comprise deriving the forecasts of real-time the distributed solar PV generation data, which comprises:

combining forecasts of global horizontal solar irradiance with estimates of installed distributed solar PV capacity data to form the forecasts of real-time the distributed solar PV generation data.

9. The system of claim 2, wherein the smoothing methods applied to the estimates of PV generation data and the normalized similarity weights applied to the smoothed estimates of distributed solar PV generation data were also used for deriving the smoothed estimates of consumption data.

10. The system of claim 7, wherein the normalized similarity weights applied to the smoothed estimates of distributed solar PV generation data are based at least in part on estimates of distributed solar PV generation data under clear sky conditions.

11. One or more non-transitory computer-readable media storing computer-executable instructions that, when executed by one or more processors, configure a computing device to perform acts comprising:

deriving weighted smoothed estimates of distributed solar photovoltaic (PV) generation data, wherein the deriving the weighted smoothed estimates of distributed solar PV generation data comprises:

deriving smoothed estimates of distributed solar PV generation data by applying smoothing methods to estimates of PV generation data;

applying normalized similarity weights to the smoothed estimates of distributed solar PV generation data to form the weighted smoothed estimates of distributed solar PV generation data; and deriving a stable sequence of forecasts of smoothed real-time consumption, wherein the deriving the stable sequence of forecasts of smoothed real-time consumption is based at least in part on smoothed estimates of consumption data, and wherein the smoothed estimates of consumption data are derived by actions comprising:

applying smoothing methods and normalized similarity weights to derive estimates of consumption;

deriving a stable sequence of forecasts of real-time measured consumption by subtracting forecasts of the distributed solar PV generation data from the stable sequence of forecasts of smoothed real-time consumption; and managing a spinning reserve of an electricity grid based at least in part on the stable sequence of forecasts of real-time measured consumption, wherein the managing comprises:

responsive to deriving the stable sequence of forecasts of real-time measured consumption, reducing the spinning reserve; and responsive to forecast instability, increasing spinning reserves.

12. The one or more non-transitory computer-readable media of claim 11, wherein the acts performed by the computing device further comprise deriving the forecasts of real-time the distributed solar PV generation data, which comprises:

combining forecasts of global horizontal solar irradiance with estimates of installed distributed solar PV capacity data to form the forecasts of real-time the distributed solar PV generation data.

13. The one or more non-transitory computer-readable media of claim 11, additionally comprising:

wherein the smoothing methods applied to the estimates of PV generation data and the normalized similarity weights applied to the smoothed estimates of distributed solar PV generation data were also used for deriving the smoothed estimates of consumption data.

\*    \*    \*    \*    \*